US011890726B2

(12) United States Patent
Bandy et al.

(10) Patent No.: US 11,890,726 B2
(45) **Date of Patent: *Feb. 6, 2024**

(54) IMPULSE DRIVER

(71) Applicant: MILWAUKEE ELECTRIC TOOL CORPORATION, Brookfield, WI (US)

(72) Inventors: Nathan Bandy, Wauwatosa, WI (US); Troy C. Thorson, Cedarburg, WI (US); Jeffrey M. Wackwitz, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/550,719

(22) Filed: Dec. 14, 2021

(65) Prior Publication Data

US 2022/0105610 A1 Apr. 7, 2022

Related U.S. Application Data

(63) Continuation of application No. 16/515,510, filed on Jul. 18, 2019, now Pat. No. 11,213,934.

(Continued)

(51) Int. Cl.

*B25B 23/145* (2006.01)
*B25B 21/02* (2006.01)

(52) U.S. Cl.

CPC .......... *B25B 21/02* (2013.01); *B25B 23/1453* (2013.01)

(58) Field of Classification Search

CPC . B25B 21/02; B25B 23/1453; B25B 23/1475; B25B 21/026; B25C 1/047; B25C 1/06

(Continued)

(56) References Cited

U.S. PATENT DOCUMENTS

| | | | |
|---|---|---|---|
| 2,293,786 A | 8/1942 | Worden | |
| 2,293,787 A | 8/1942 | Worden | |

(Continued)

FOREIGN PATENT DOCUMENTS

| | | |
|---|---|---|
| EP | 0631851 A1 | 1/1995 |
| EP | 1454715 B1 | 8/2009 |

(Continued)

OTHER PUBLICATIONS

Crown Oil, "Hydraulic Oil Explained—An Easy Guide," available at <https://www.crownoil.co.uk/guides/hydraulic-oil-guide> web page visited Nov. 29, 2022 (17 pages).

(Continued)

*Primary Examiner* — Robert F Long

(74) *Attorney, Agent, or Firm* — Michael Best & Friedrich LLP

(57) ABSTRACT

A power tool includes a housing, a motor positioned within the housing, and an impulse assembly coupled to the motor to receive torque therefrom. The impulse assembly includes a cylinder at least partially forming a chamber containing a hydraulic fluid, an anvil positioned at least partially within the chamber, and a hammer positioned at least partially within the chamber. The hammer includes a first side facing the anvil and a second side opposite the first side. The impulse assembly further includes a biasing member biasing the hammer towards the anvil, and a valve movable between a first position that permits a first fluid flow rate of the hydraulic fluid in the chamber from the second side to the first side, and a second position that permits a second fluid flow rate of the hydraulic fluid in the chamber from the first side to the second side.

19 Claims, 25 Drawing Sheets

Related U.S. Application Data

(60) Provisional application No. 62/873,024, filed on Jul. 11, 2019, provisional application No. 62/847,520, filed on May 14, 2019, provisional application No. 62/699,911, filed on Jul. 18, 2018.

(58) Field of Classification Search
USPC .......... 227/129–130; 173/90–93.5, 197, 213, 173/171
See application file for complete search history.

(56) References Cited

U.S. PATENT DOCUMENTS

| | | | | |
|---|---|---|---|---|
| 2,476,632 | A | | 7/1949 | Shaff |
| 2,720,956 | A | | 10/1955 | Coombes |
| 2,821,276 | A | | 1/1958 | Reynolds |
| 2,973,071 | A | | 2/1961 | Sturrock |
| 3,068,973 | A | | 12/1962 | Mauer |
| 3,104,743 | A | | 9/1963 | Reynolds |
| 3,181,672 | A | * | 5/1965 | Swanson ............. B25B 23/1453 418/40 |
| 3,319,723 | A | | 5/1967 | Kramer |
| 3,581,831 | A | | 6/1971 | Biek |
| 3,622,062 | A | | 11/1971 | Goode, Jr. et al. |
| 3,835,934 | A | | 9/1974 | Schoeps et al. |
| 3,908,373 | A | | 9/1975 | Peterson |
| 4,316,512 | A | * | 2/1982 | Kibblewhite ....... B25B 23/1453 173/183 |
| 4,635,731 | A | | 1/1987 | Wallace et al. |
| 4,669,553 | A | | 6/1987 | Hukase |
| 4,683,961 | A | * | 8/1987 | Schoeps .............. B25B 23/1453 464/25 |
| 4,735,595 | A | * | 4/1988 | Schoeps ................ B25B 21/026 464/25 |
| 5,092,410 | A | | 3/1992 | Wallace et al. |
| 5,117,919 | A | | 6/1992 | Borries et al. |
| 5,607,023 | A | | 3/1997 | Palm |
| 5,720,423 | A | | 2/1998 | Kondo |
| 5,897,454 | A | | 4/1999 | Cannaliato |
| 6,655,570 | B2 | | 12/2003 | Shkolnikov et al. |
| 6,782,956 | B1 | | 8/2004 | Seith et al. |
| 6,863,134 | B2 | | 3/2005 | Seith et al. |
| 9,259,826 | B2 | | 2/2016 | Soderlund |
| 9,352,456 | B2 | | 5/2016 | Murthy et al. |
| 9,597,784 | B2 | | 3/2017 | Mcclung |
| 10,508,495 | B2 | | 12/2019 | Swinford |
| 2001/0027871 | A1 | | 10/2001 | Tokunaga |
| 2005/0199404 | A1 | | 9/2005 | Furuta et al. |
| 2005/0247750 | A1 | | 11/2005 | Burkholder et al. |
| 2009/0056966 | A1 | | 3/2009 | Grand et al. |
| 2013/0270319 | A1 | | 10/2013 | Gauger et al. |
| 2014/0202724 | A1 | | 7/2014 | Moore et al. |
| 2014/0262396 | A1 | | 9/2014 | McClung |
| 2014/0360744 | A1 | | 12/2014 | Lawrence |
| 2015/0102084 | A1 | | 4/2015 | Zhao |
| 2016/0158819 | A1 | | 6/2016 | Johnson |
| 2016/0311094 | A1 | | 10/2016 | Mergener et al. |
| 2016/0318165 | A1 | | 11/2016 | Thorson et al. |
| 2017/0001289 | A1 | * | 1/2017 | Söderlund ............. B25B 21/026 |
| 2017/0190028 | A1 | | 7/2017 | Howard et al. |
| 2017/0246732 | A1 | | 8/2017 | Dey, IV et al. |
| 2017/0259412 | A1 | | 9/2017 | Nishikawa et al. |
| 2018/0236646 | A1 | | 8/2018 | Raggl et al. |
| 2019/0022842 | A1 | | 1/2019 | Douchi |
| 2019/0134795 | A1 | | 5/2019 | Bauer |
| 2019/0168366 | A1 | | 6/2019 | Yasutomi et al. |
| 2019/0224832 | A1 | | 7/2019 | Watanabe et al. |
| 2020/0023501 | A1 | | 1/2020 | Bandy et al. |
| 2020/0061786 | A1 | | 2/2020 | Zhang |
| 2020/0215668 | A1 | | 7/2020 | Duncan et al. |
| 2022/0097215 | A1 | | 3/2022 | Dales et al. |
| 2023/0191567 | A1 | * | 6/2023 | Opsitos, Jr. ........... B25B 21/023 81/464 |

FOREIGN PATENT DOCUMENTS

| | | | | | |
|---|---|---|---|---|---|
| JP | 2006255823 | A | | 9/2006 | |
| JP | 2011125994 | A | | 6/2011 | |
| JP | 2012076165 | A | | 4/2012 | |
| JP | 2015188953 | A | | 11/2015 | |
| WO | 9600139 | A1 | | 1/1996 | |
| WO | 2012002578 | A1 | | 1/2012 | |
| WO | 2012134474 | A1 | | 10/2012 | |
| WO | WO-2014197201 | A2 | * | 12/2014 | ............. B25B 21/02 |

OTHER PUBLICATIONS

Extended European Search Report for Application No. 22193960.6 dated Nov. 29, 2022 (9 pages).

European Patent Office Extended Search Report for Application No. 19186945.2 dated May 18, 2020 (6 pages).

* cited by examiner

IMPULSE DRIVER

CROSS-REFERENCE TO RELATED APPLICATIONS

This application is a continuation of U.S. patent application Ser. No. 16/515,510 filed on Jul. 18, 2019, now U.S. Pat. No 11,213,934, which claims priority to U.S. Provisional Patent Application No. 62/873,024 filed on Jul. 11, 2019, U.S. Provisional Patent Application No. 62/847,520 filed on May 14, 2019, and U.S. Provisional Patent Application No. 62/699,911 filed on Jul. 18, 2018, the entire contents of which are incorporated herein by reference.

FIELD OF THE INVENTION

The present invention relates to power tools, and more particularly to hydraulic impulse power tools.

BACKGROUND OF THE INVENTION

Impulse power tools are capable of delivering rotational impacts to a workpiece at high speeds by storing energy in a rotating mass and transmitting it to an output shaft. Such impulse power tools generally have an output shaft, which may or may not be capable of holding a tool bit or engaging a socket. Impulse tools generally utilize the percussive transfers of high momentum, which is transmitted through the output shaft using a variety of technologies, such as electric, oil-pulse, mechanical-pulse, or any suitable combination thereof.

SUMMARY OF THE INVENTION

The invention provides, in one aspect, a power tool including a housing, a motor positioned within the housing and an impulse assembly coupled to the motor to receive torque therefrom. The impulse assembly includes a cylinder at least partially forming a chamber containing a hydraulic fluid, an anvil positioned at least partially within the chamber, and a hammer positioned at least partially within the chamber. The hammer includes a first side facing the anvil and a second side opposite the first side. The impulse assembly further includes a biasing member biasing the hammer towards the anvil, and a valve movable between a first position that permits a first fluid flow rate of the hydraulic fluid in the chamber from the second side to the first side, and a second position that permits a second fluid flow rate of the hydraulic fluid in the chamber from the first side to the second side.

The invention provides, in another aspect, a power tool including a housing, a motor positioned within the housing, and an impulse assembly coupled to the motor to receive torque therefrom. The impulse assembly includes a cylinder at least partially forming a first chamber containing a hydraulic fluid and a second, expansion chamber in fluid communication with the first chamber to receive hydraulic fluid therefrom, an anvil positioned at least partially within the first chamber, and a hammer positioned at least partially within the first chamber and engageable with the anvil for transferring rotational impacts to the anvil. The impulse assembly further includes a biasing member biasing the hammer towards the anvil, and a plug positioned within the expansion chamber. The plug is movable relative to the cylinder to vary a volume of the expansion chamber.

The invention provides, in another aspect, a power tool including a housing, a motor positioned within the housing, a controller electrically coupled to the motor, and a transmission coupled to the motor. The transmission includes a ring gear and a torque transducer coupled to the ring gear. The torque transducer is configured to transmit a torque value to the controller. The power tool further including an impulse assembly coupled to the transmission to receive torque therefrom. The controller is configured to receive a target output torque value and to determine an actual output torque based at least in part on the torque value from the torque transducer, and the controller is configured to stop operation of the motor in response to the actual output torque being within a predefined margin of the target output torque value.

The invention provides, in another aspect, a power tool including a housing, a motor positioned within the housing, a controller electrically coupled to the motor, and a transmission coupled to the motor. The transmission includes a ring gear and a torque transducer coupled to the ring gear. The torque transducer is configured to transmit a torque value to the controller. The power tool further includes an impulse assembly coupled transmission to receive torque therefrom. The controller is configured to receive a target rotational value and to detect an initial seating of a fastener. A rotation value is calculated in response to detecting the initial seating of the fastener. The controller is configured to stop operation of the motor in response to the rotation value being equal to the target rotational value.

The invention provides, in another aspect, a power tool including a housing, a motor positioned within the housing, a controller electrically coupled to the motor, a sensor electrically coupled to the controller, and a transmission coupled to the motor. The transmission includes a ring gear and a torque transducer coupled to the ring gear. The torque transducer is configured to transmit a torque value to the controller. The power tool further includes an impulse assembly coupled to the transmission assembly to receive torque therefrom. The controller is configured to receive a target criteria value. The controller is configured to monitor a sensed parameter from the sensor and determine whether a fastener has been seated based on comparing the sensed parameters to the target criteria value. The controller is configured to stop operation of the motor in response to the sensed parameters being determined to be substantially equal to target criteria.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1A:
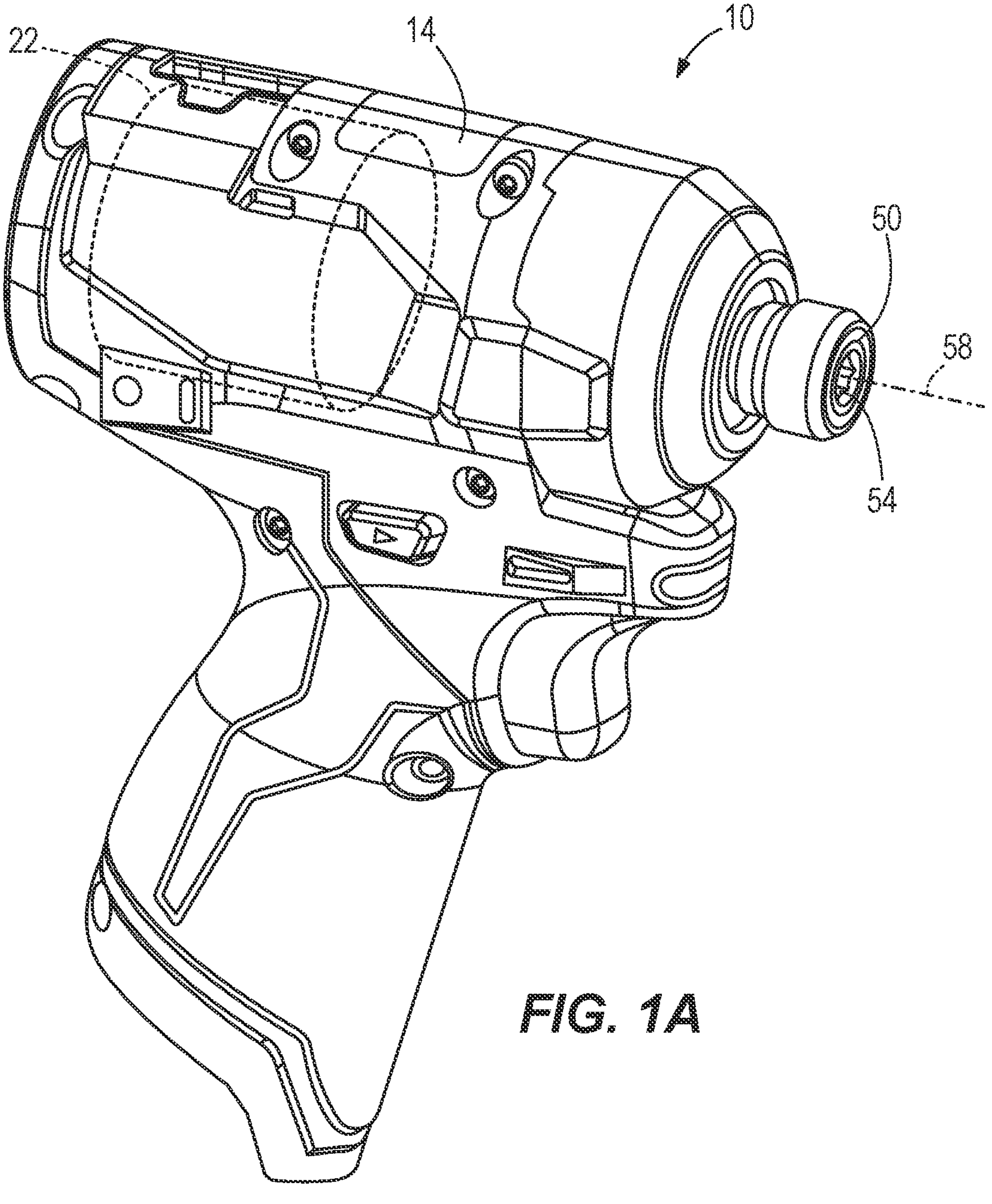
FIG. 1A is a front perspective view of a first impulse power tool, according to some embodiments.

With reference to FIG. 1A, an impulse power tool (e.g., an impulse driver 10) is shown. The impulse driver 10 includes a main housing 14 and a rotational impulse assembly 18 (see FIG. 2) positioned within the main housing 14. The impulse driver 10 also includes an electric motor 22 (e.g., a brushless direct current motor) coupled to the impulse assembly 18 to provide torque thereto and positioned within the main housing 14, and a transmission (e.g., a single or multi-stage planetary transmission) positioned between the motor 22 and the impulse assembly 18. In some embodiments, the impulse driver 10 is battery-powered and is configured to be powered by a battery with a voltage less than 18 volts. In other embodiments, the impulse driver 10 is configured to be powered by a battery with a voltage below 12.5 volts. In another embodiment, the tool is configured to be powered by a battery with a voltage below 12 volts.

Figure 1B:
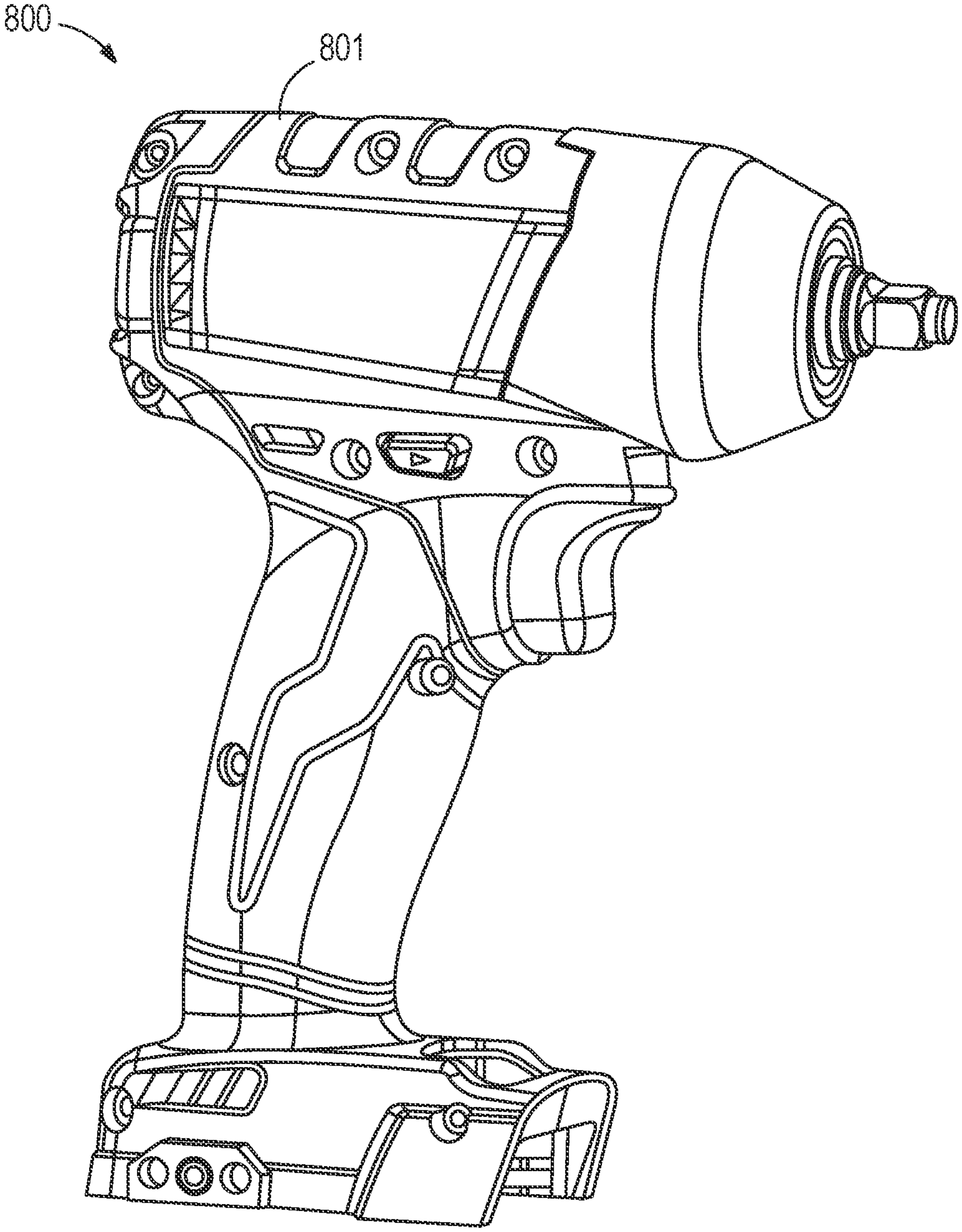
FIG. 1B is a front perspective view of a second impulse power tool, according to some embodiments.

With reference to FIG. 1B, an alternative embodiment of an impulse power tool 800 is shown, according to some embodiments. The impulse tool 800 (e.g., an impulse wrench) is configured to have a similar mode of operation as the impulse driver 10, described above. In some embodiments, the impulse tool 800 is configured to provide additional capabilities when compared with the impulse driver 10. For example, the impulse tool 800 may include a larger or more powerful motor, transmission, impulse assembly, etc. In the embodiment of FIG. 1B, the impulse tool 800 is configured to be powered by a battery with a nominal voltage of between 17 volts and 21 volts, greater than 18 volts. In other embodiments, the nominal voltage of the battery is larger, smaller, or within a different range. The impulse tool 800 is described in more detail in regards to FIG. 8, below.

Figure 2:
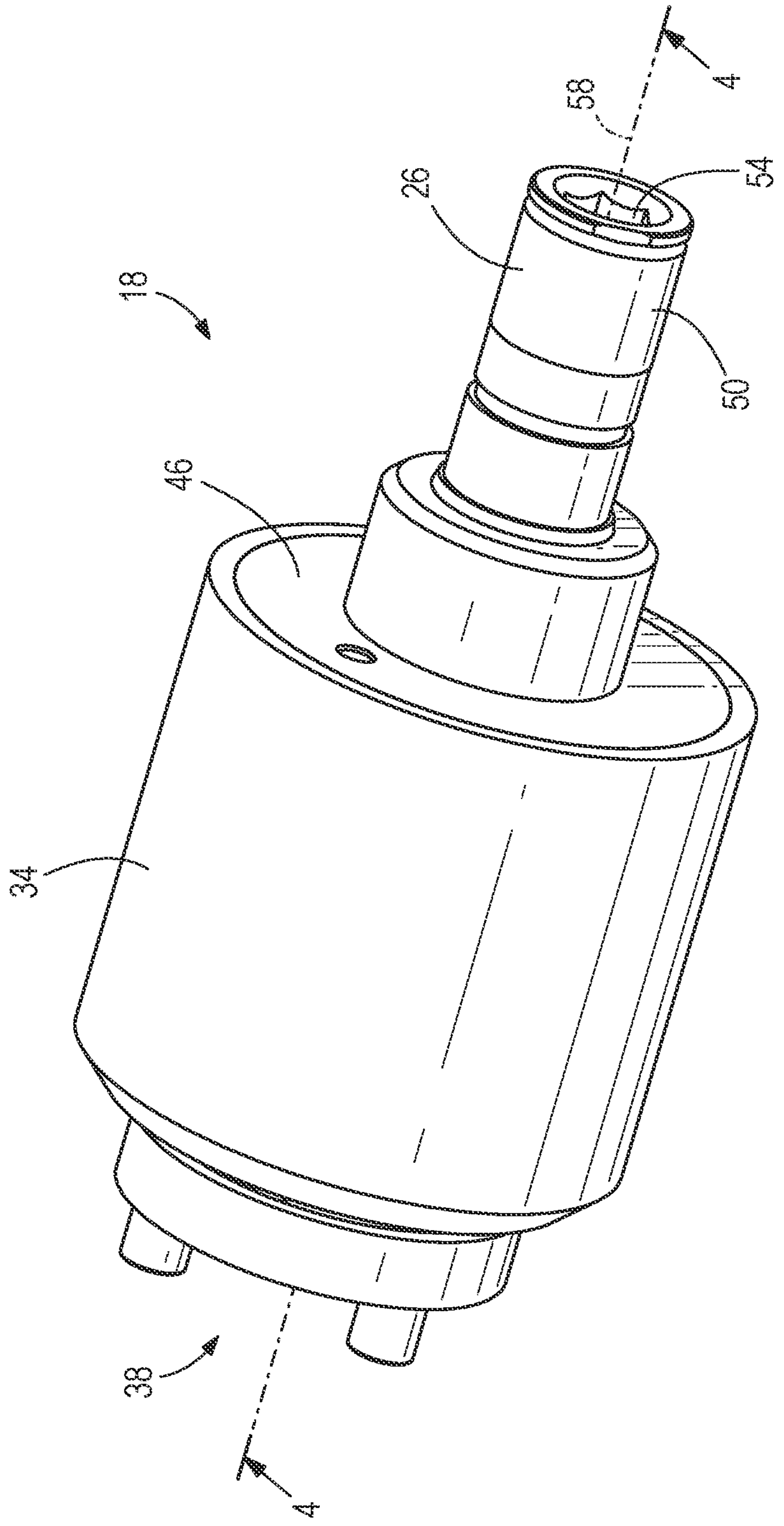
FIG. 2 is a perspective view of an impulse assembly, according to some embodiments.
Figure 3:
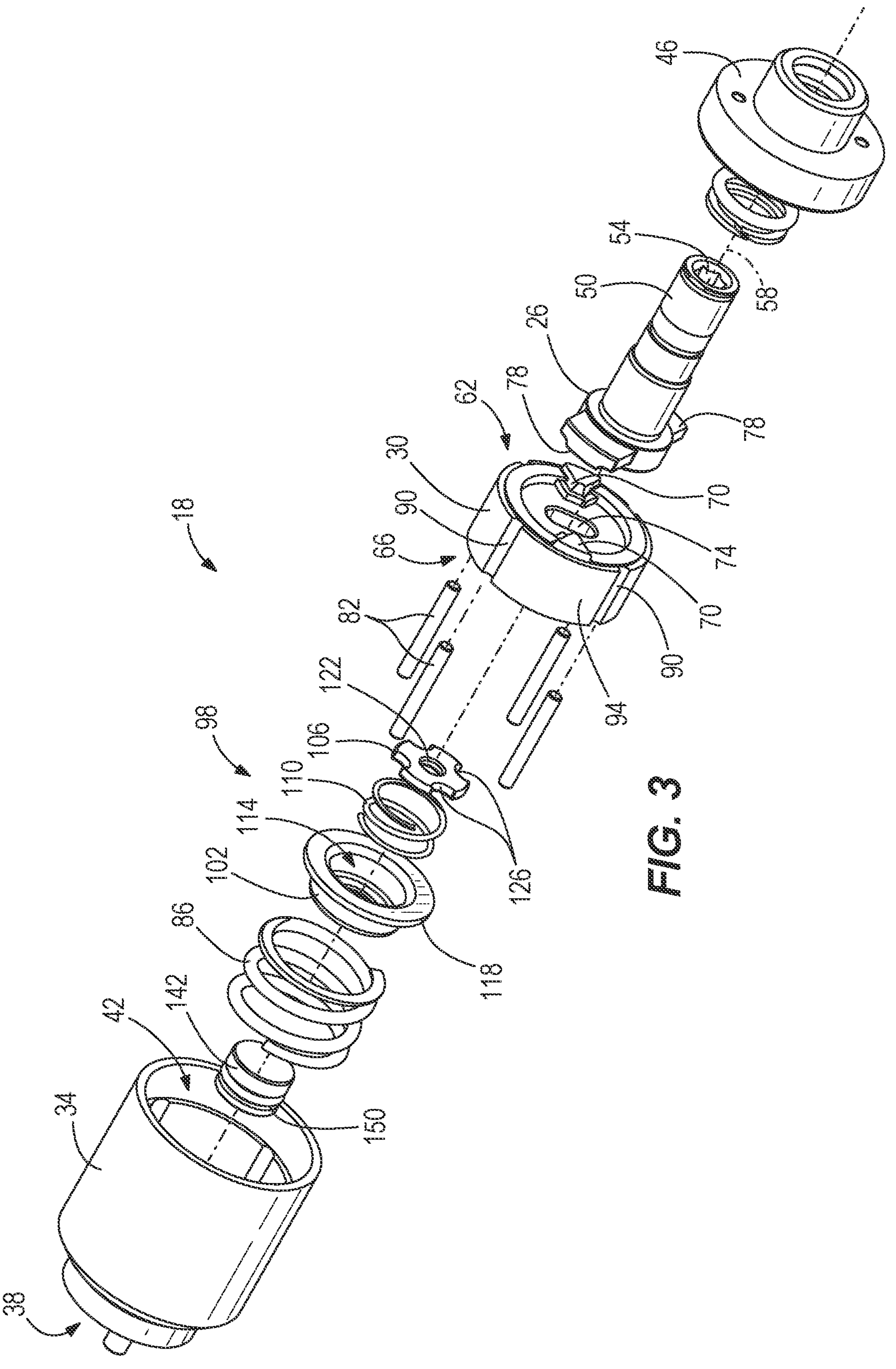
FIG. 3 is an exploded view of the impulse assembly of FIG. 2, according to some embodiments.
Figure 4:
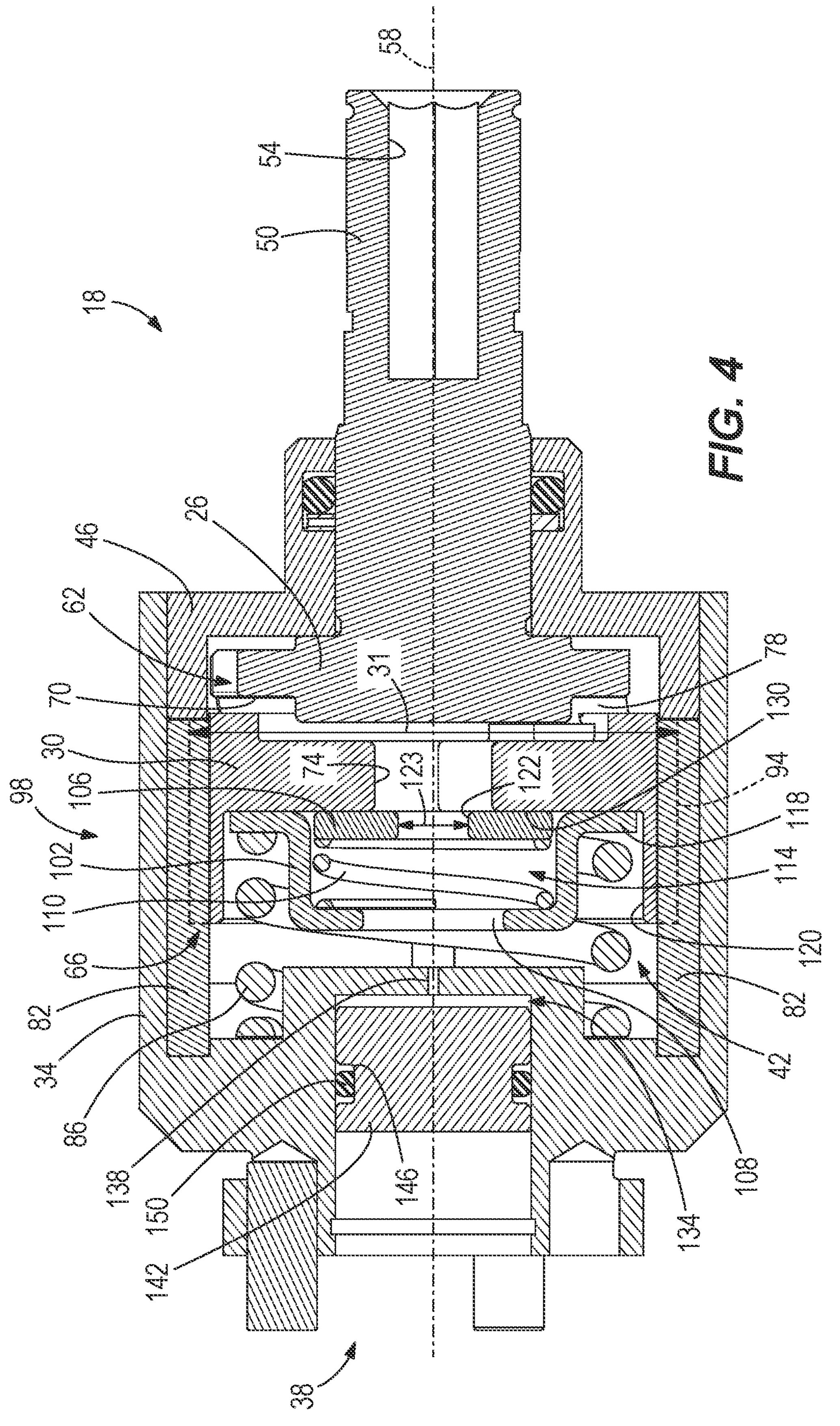
FIG. 4 is a cross-sectional view of the impulse assembly of FIG. 2, taken along lines 4-4 shown in FIG. 2, according to some embodiments.

With reference to FIGS. 2-4, the impulse assembly 18 includes an anvil 26, a hammer 30, and a cylinder 34. A driven end 38 of the cylinder 34 is coupled to the electric motor 22 to receive torque therefrom, causing the cylinder 34 to rotate. The cylinder 34 at least partially defines a chamber 42 (FIG. 4) that contains an incompressible fluid (e.g., hydraulic fluid, oil, etc.). The chamber 42 is sealed and is also partially defined by an end cap 46 secured to the cylinder 34. The hydraulic fluid in the chamber 42 reduces the wear and the noise of the impulse assembly 18 that is created by impacting the hammer 30 and the anvil 26.

With continued reference to FIGS. 2-4, the anvil 26 is positioned at least partially within the chamber 42 and includes an output shaft 50 with a hexagonal receptacle 54 therein for receipt of a tool bit. The output shaft 50 extends from the chamber 42 and through the end cap 46. The anvil 26 rotates about a rotational axis 58 defined by the output shaft 50.

With continued reference to FIGS. 2-4, the hammer 30 is positioned at least partially within the chamber 42. The hammer 30 includes a first side 62 facing the anvil 26 and a second side 66 opposite the first side 62. The hammer 30 further includes hammer lugs 70 and a central aperture 74 extending between the sides 62, 66. As discussed in greater detail below, the central aperture 74 permits the hydraulic fluid in the chamber 42 to pass through the hammer 30. The hammer lugs 70 correspond to lugs 78 formed on the anvil 26. The rotational impulse assembly 18 further includes hammer alignment pins 82 and a hammer spring 86 (i.e., a first biasing member) positioned within the chamber 42. The hammer alignment pins 82 are coupled to the cylinder 34 and are received within corresponding grooves 90 formed on an outer circumferential surface 94 of the hammer 30 to rotationally unitize the hammer 30 to the cylinder 34 such that the hammer 30 co-rotates with the cylinder 34. The pins 82 also permit the hammer 30 to axially slide within the cylinder 34 along the rotational axis 58. In other words, the hammer alignment pins 82 slide within the grooves 90 such that the hammer 30 is able to translate along the axis 58 relative to the cylinder 34. The hammer spring 86 biases the hammer 30 toward the anvil 26.

Figure 2A:
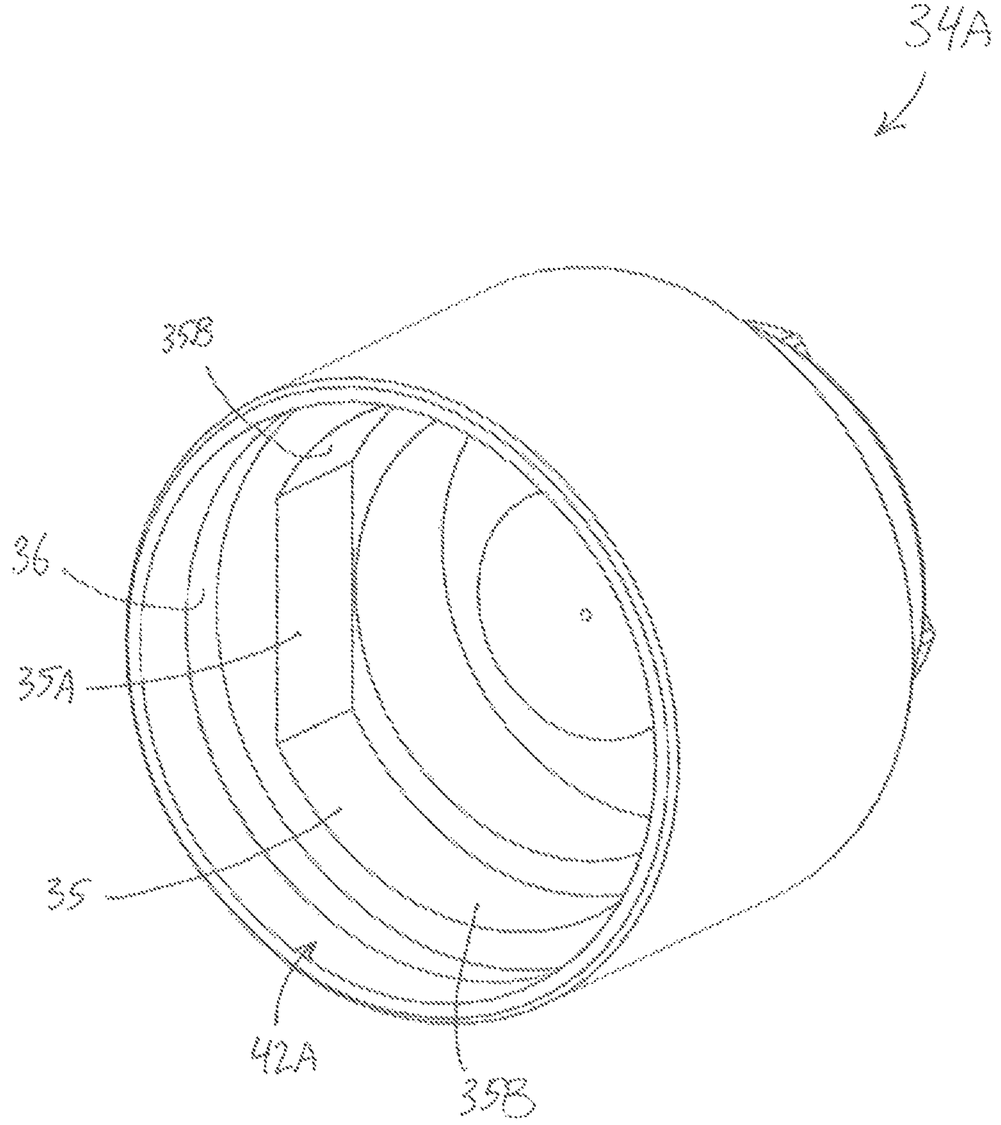
FIG. 2A is a perspective view of a cylinder according to some embodiments.
Figure 2B:
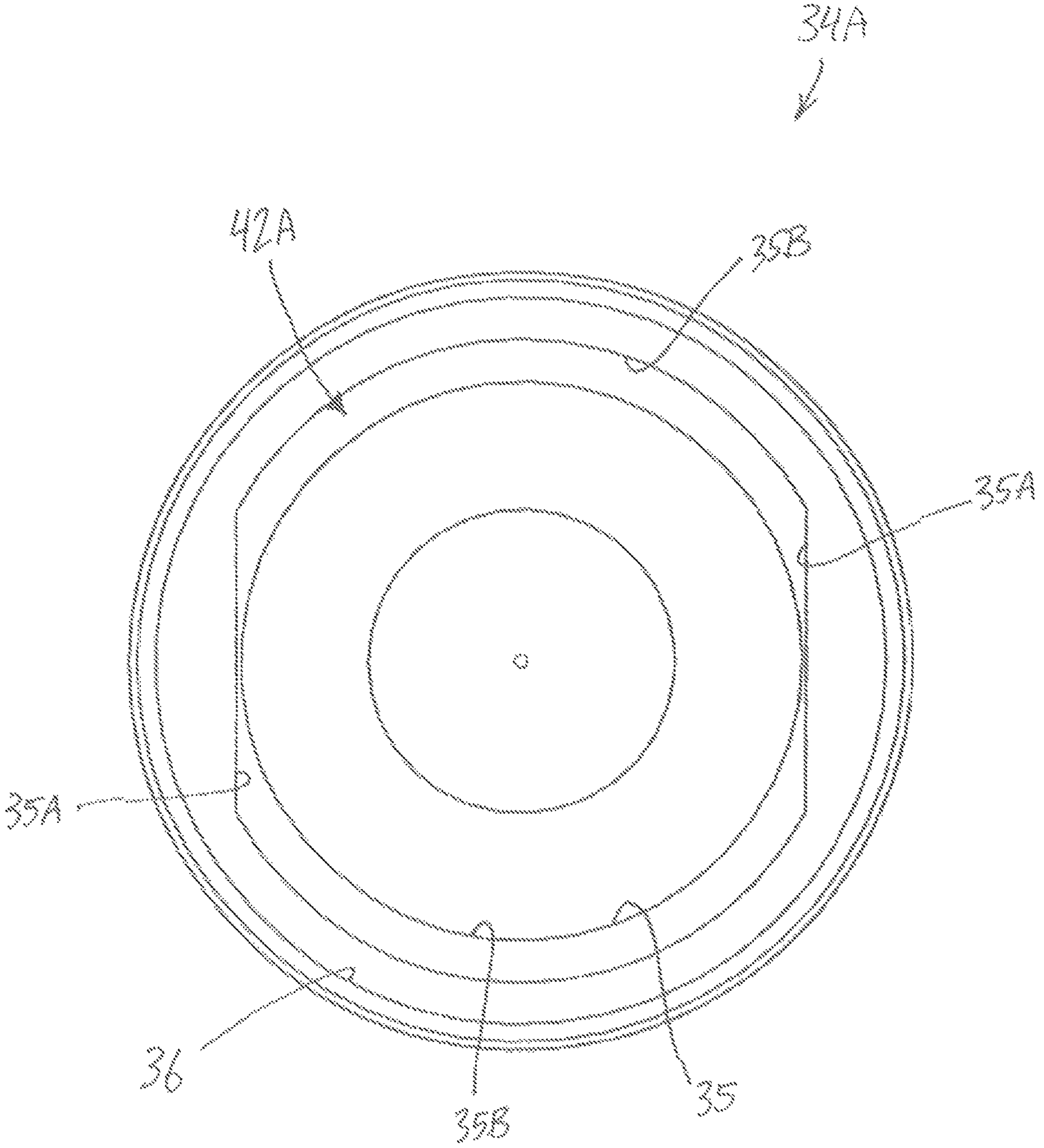
FIG. 2B is a front view of the cylinder of FIG. 2A.
Figure 2C:
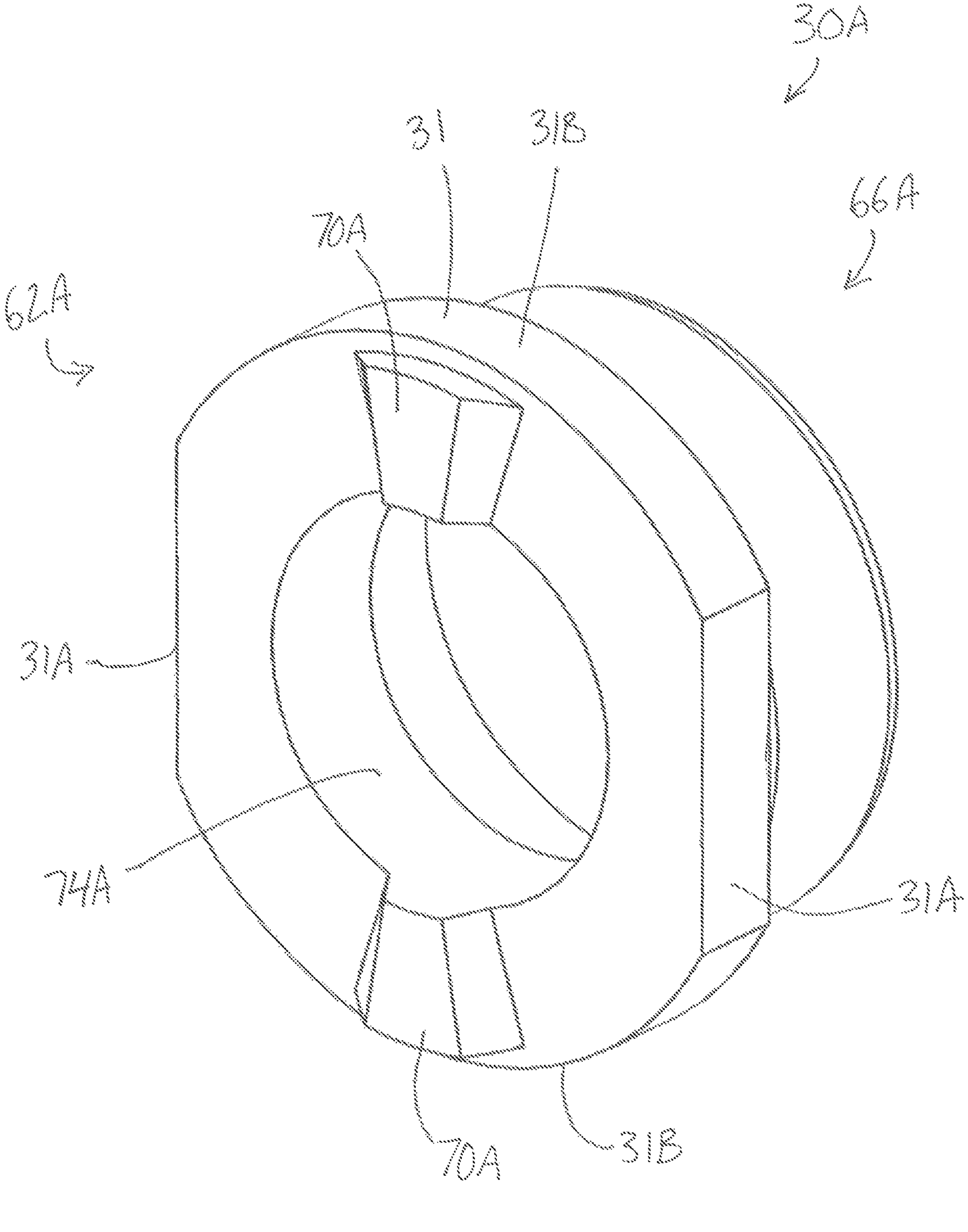
FIG. 2C is a perspective view of a hammer according to some embodiments.

With reference to FIGS. 2A, 2B, and 2C, a hammer 30A and a cylinder 34A of an impulse assembly according to an alternative embodiment are illustrated. Specifically, FIGS. 2A and 2B discloses the cylinder 34A that is similar to the cylinder 34 of FIG. 2, and FIG. 2C illustrates the hammer

30A that is similar to the hammer 30 of FIG. 3, with only the differences described below. The cylinder 34A and the hammer 30A utilize corresponding double-D shapes to rotationally unitize the cylinder 34*a* and the hammer 30A. The double-D shape eliminates the need to utilize additional components (e.g., hammer alignment pins 82) to rotationally unitize the hammer 30A and the cylinder 34A, while still allowing the hammer 30A to slide axially with respect to the cylinder 34A. Specifically, the cylinder 34A at least partially defines a chamber 42A with a double-D shaped circumferential profile 35 formed on an inner surface 36 of the cylinder 34A. In other words, the profile 35 includes two planar portions 35A connected by two arcuate portions 35B (FIG. 2B). The hammer 30A is positioned at least partially within the chamber 42A. The hammer 30A includes a first side 62A facing an anvil and a second side 66A opposite the first side 62A. The hammer 30A further includes hammer lugs 70A and a central aperture 74A extending between the sides 62A, 66A. The hammer 30A further includes an outer circumferential surface 31 that is double-D shaped. Specifically, the outer circumferential surface 31 corresponds to the profile 35 of the cylinder 34A. In other words, the outer circumferential surface 31 includes two planar portions 31A connected by two arcuate portions 31B.

The impulse driver 10 further defines a trip torque, which determines the reactionary torque threshold required on the anvil 26 before an impact cycle begins. In one embodiment, the trip torque is equal to the sum of the torque due to seal drag, the torque due to the spring 86, and the torque due to the difference in rotational speed of the hammer 30 and the anvil 26. In particular, the seal drag torque is the static friction between the O-ring and the anvil 26. The spring torque contribution to the total trip torque is based on, among other things, the spring rate of the spring 86, the height of the lugs 70, the spring 86 pre-load, the angle of the lugs 70, and the coefficient of friction between the anvil lugs 78 and the hammer lugs 70. The torque from the difference in rotational speed of the anvil 26 and the hammer 30 is included in the torque calculation during impaction only, and has little to no effect on determining the trip torque threshold (i.e., is the damping force of the fluid rapidly moving through the orifice 122). In some embodiments, the trip torque is within a range between approximately 10 in-lbf and approximately 30 in-lbf. In other embodiments, the trip torque is greater than 20 in-lbf. Increasing the trip torque increases the amount of time the hammer 30 and the anvil 26 are co-rotating (i.e., in a continuous drive). In one embodiment, the tool is an oil pulse mechanism that also includes a spring to increase trip torque.

With reference to FIGS. 3 and 4, the impulse assembly 18 further includes a valve assembly 98 positioned within the chamber 42 that allows for various fluid flow rates through the valve assembly 98. As described in greater detail below, the valve assembly 98 adjusts the flow of the hydraulic fluid in the chamber 42 to decrease the amount of time it takes the hammer 30 to return to the anvil 26. In other words, the valve assembly 98 reduces the time it takes to complete a single impact cycle. In particular, the flow rate through the valve assembly 98 varies as the hammer 30 translates within the cylinder 34 along the axis 58. The valve assembly 98 includes a valve housing 102 (e.g., a cupped washer), a valve (e.g., an annular disc 106), and a spring 110 (i.e., a second biasing member) positioned between the valve housing 102 and the disc 106. The valve housing 102 includes a rear aperture 108 and defines a cavity 114 in which the disc 106 and the spring 110 are positioned. The spring 110 biases the disc 106 toward the hammer 30, and the hammer spring 86 biases the valve housing 102 toward the hammer 30. In particular, the valve housing 102 includes a circumferential flange 118 against which the spring 86 is seated to bias the valve housing 102 toward the hammer 30. In other words, the valve housing 102 is at least partially positioned between the spring 86 and the hammer 30. With reference to FIG. 4, the hammer 30 defines a recess 120 and the valve assembly 102 is at least partially received with the recess 120.

With reference to FIG. 3, the disc 106 includes a central aperture 122 and at least one auxiliary opening 126. The aperture 122 of the disc 106 is in fluid communication with the aperture 74 formed in the hammer 30 (FIG. 4). In the illustrated embodiment, the auxiliary openings 126 are positioned circumferentially around the aperture 122 and are formed as grooves in the outer periphery of the disc 106. In other embodiments, the auxiliary openings may be apertures formed in any location on the disc 106. In further alternative embodiments, the auxiliary opening may be formed as part of the central aperture 122 to form one single aperture with less than the entire aperture in fluid communication with the aperture 74 during at least a portion of operation. In other words, the auxiliary openings may be formed as cutouts or scallops contiguous with the central aperture 122 that are sometimes blocked and sometimes opened by the hammer 66 during operation of the impulse driver 10.

With continued reference to FIG. 4, the central aperture 122 defines an orifice diameter 123 and the hammer 30 defines a hammer diameter 31. A ratio R of the hammer diameter 31 to the orifice diameter 123 is large and beneficially allows less reliance on tolerances and removes a feature that requires calibration. Additionally, the large ratio R makes leak paths less significant relative to fluid moved by the hammer 30. Furthermore, the impulse tool 10 has a greater total amount of fluid contained within the impulse assembly 18. As such, a greater volume of fluid is moved with each stroke of the hammer 30. In one embodiment, the total fluid in the impulse assembly 18 is greater than approximately 18,000 cubic mm (18 mL). In another embodiment, the total fluid in the impulse assembly 18 is greater than approximately 20,000 cubic mm (20 mL). In another embodiment, the total fluid in the impulse assembly 18 is greater than approximately 22,000 cubic mm (22 mL). Likewise, the amount of fluid moved with each stroke of the hammer 30 in one embodiment is greater than approximately 1000 cubic mm (1 mL). In another embodiment, the fluid moved with each stroke of the hammer 30 is greater than approximately 1250 cubic mm (1.25 mL). In another embodiment, the fluid moved with each stroke of the hammer 30 is approximately 1500 cubic mm (1.5 mL). A greater amount of fluid moved with each stroke of the hammer 30 results in fluid leak paths having a proportionally smaller effect on the performance of the tool 10. Additionally, by moving a greater area of fluid, the impulse assembly 18 experiences less pressure for the same amount of torque.

The disc 106 is moveable between a first position (FIG. 4) that permits a first hydraulic fluid flow rate in the chamber 42 from the second side 66 to the first side 62 of the hammer 30, and a second position (FIG. 7B) that permits a second hydraulic fluid flow rate in the chamber 42 from the first side 62 to the second side 66 of the hammer 30. In the illustrated embodiment, the second fluid flow rate is greater than the first fluid flow rate, and the disc 106 is in the second position (FIG. 7B) when the hammer 30 moves along the axis 58 toward the anvil 26. In particular, the hammer 30 defines a rear surface 130 on the second side 66 and the disc 106 engages the rear surface 130 when the disc 106 is in the first position (FIG. 4). In contrast, the disc 106 is spaced from the rear surface 130 when the disc 106 is in the second position (FIG. 7B).

With reference to FIGS. 3 and 4, when the disc 106 is in the first position, the hydraulic fluid flows through the central aperture 122 but does not flow through the auxiliary openings 126. In other words, when the valve assembly 98 is in a closed state (FIG. 4), the spring 110 biases the disc 106 against the hammer 30, blocking the auxiliary openings 126 with the rear surface 130 while the central opening 122 remains in fluid communication with the aperture 74 formed in the hammer 30 (FIG. 4). When the disc 106 is in the second position, the hydraulic fluid flows through the central aperture 122 and the auxiliary openings 126. In other words, when the valve assembly 98 is in an open state (FIG. 7B), the disc 106 separates from the hammer 30, which unblocks the auxiliary openings 126 and places the auxiliary openings 126 in fluid communication with the central aperture 74 of the hammer 30. As a result, the valve assembly 98 provides an increased hydraulic fluid flow rate in one direction, which allows faster fluid pressure equalization when the hammer 30 is translating along the axis 58 toward the anvil 26.

With continued reference to FIGS. 3 and 4, the impulse tool 10 further includes an expansion chamber 134 defined in the cylinder 34. The expansion chamber 134 contains the hydraulic fluid and is in fluid communication with the chamber 42 by a passageway 138 (e.g., a pin hole) formed within the cylinder 34. A plug 142 is positioned within the expansion chamber 134 and is configured to translate within the expansion chamber 134 to vary a volume of the expansion chamber 134. In other words, the plug 142 moves with respect to the cylinder 34 to vary the volume of the expansion chamber 134. The size of the passageway 138 is minimized to restrict flow between the expansion chamber 134 and the chamber 142 and to negate the risk of large pressure developments over a short period of time, which may otherwise cause significant fluid flow into the expansion chamber 134. In some embodiments, the diameter of the passageway 138 is within a range between approximately 0.4 mm and approximately 0.6 mm. In further embodiments, the diameter of the passageway 138 is approximately 0.5 mm. In the illustrated embodiment, the plug 142 includes an annular groove 146 and an O-ring 150 positioned within the annular groove 146. The O-ring 150 seals the sliding interface between the plug 142 and the expansion chamber 134. As such, the plug 142 moves axially within the expansion chamber 134 to accommodate changes in temperature and/or pressure resulting in the expansion or contraction of the fluid within the sealed rotational impulse assembly 18. As such, a bladder or the like compressible member is not required in the cylinder 34 to accommodate pressure changes.

Over extended periods of use, the output torque of the impulse assembly 18 may degrade because the fluid within the sealed rotational impulse assembly 18 generates heat and as the temperature increases, the fluid viscosity changes. A fluid with a higher viscosity index (VI) is utilized to reduce the change in viscosity due to changes in temperature, thereby providing more consistent performance. In one embodiment, the fluid viscosity index is greater than approximately 35. In another embodiment, the fluid viscosity index is greater than approximately 80. In another embodiment, the fluid viscosity index is greater than approximately 150. In another embodiment, the fluid viscosity index is greater than approximately 350. In another embodiment, the fluid viscosity index is within a range between approximately 80 and approximately 110. In another embodiment, the fluid viscosity index is within a range between approximately 150 and approximately 170. In another embodiment, the fluid viscosity index is within a range between approximately 350 and approximately 370. The tool 10 includes a temperature sensor that senses the temperature of the fluid within the impulse assembly 18 and communicates the fluid temperature to a controller. The controller is configured to then electrically compensate for changing fluid temperature in order to output consistent torque at different temperatures. For example and with reference to FIG. 10, temperature sensor 1006 measures the temperature of the impulse assembly 802 (or the temperature of the fluid within the impulse assembly 802), and the temperature sensor 1006 output is electrically communicated to controller 812.

Figure 5:
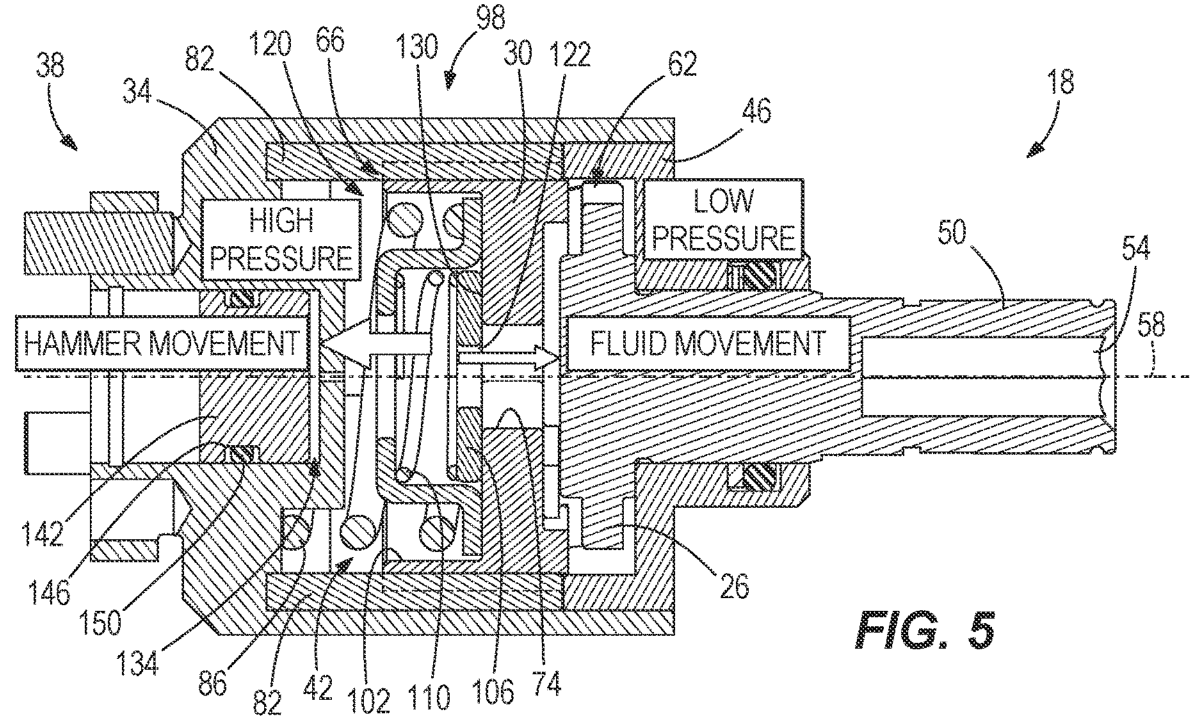
FIG. 5 is a cross-sectional view of the impulse assembly of FIG. 2, illustrating an overview of a retraction phase, according to some embodiments.
Figure 6A:
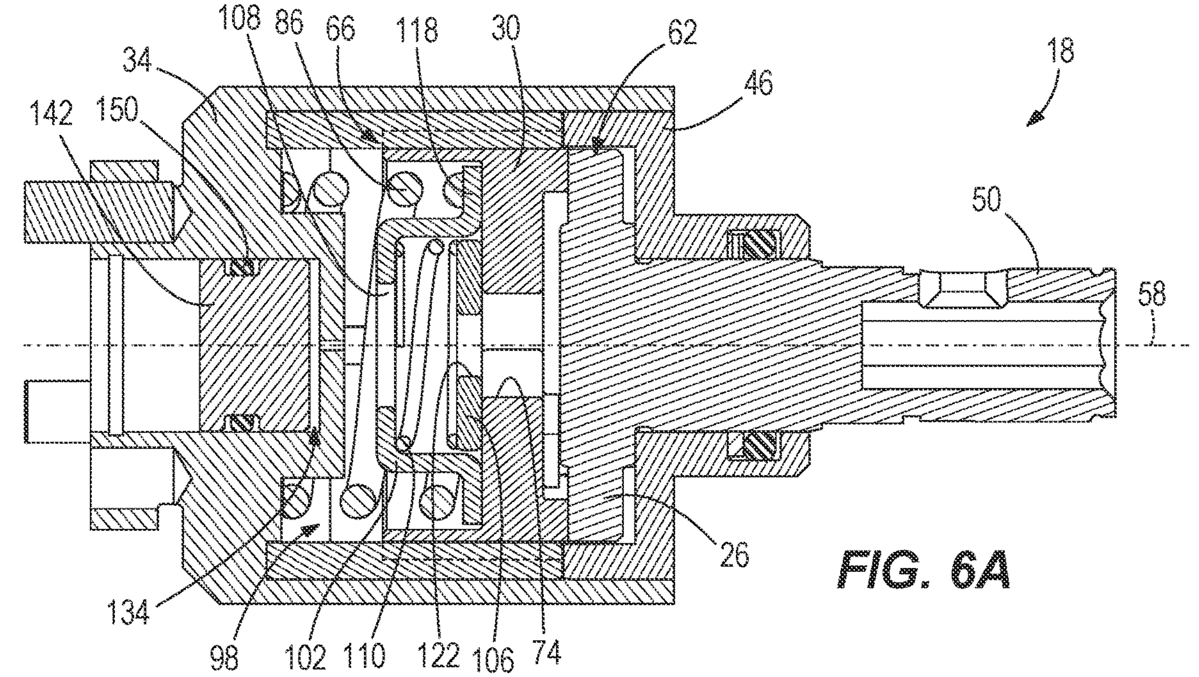
FIGS. 6A-6C are cross-sectional views of the impulse assembly of FIG. 2, illustrating operation of the retraction phase, according to some embodiments.
Figure 6B:
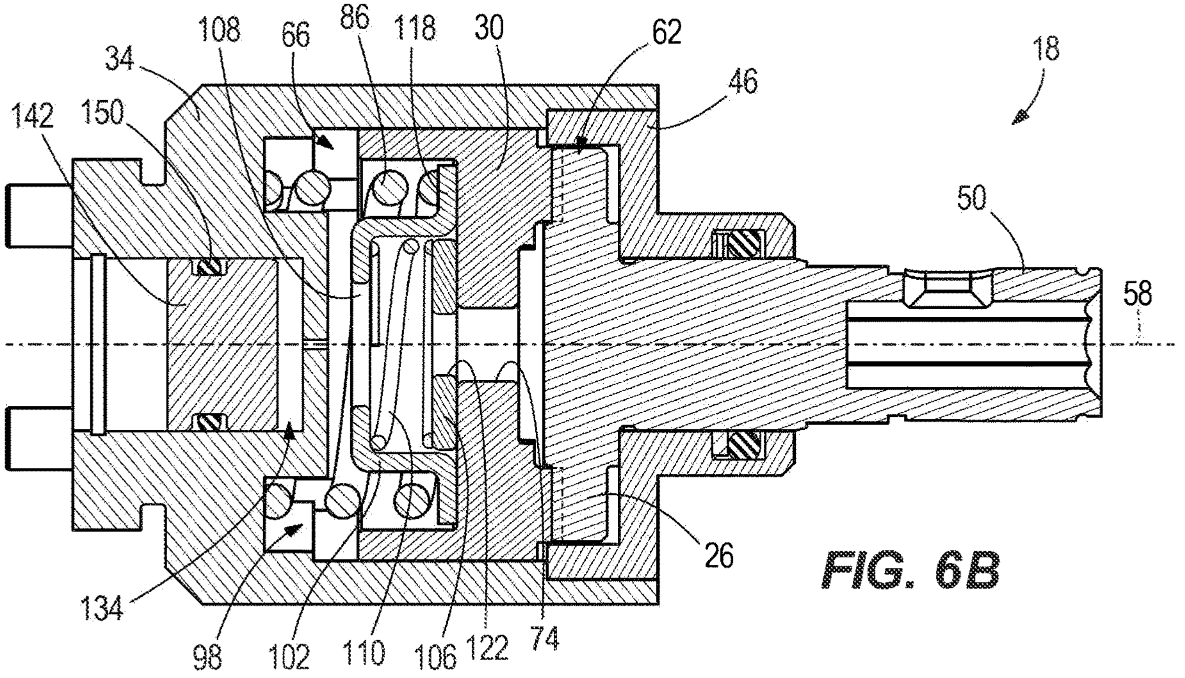
Figure 6C:
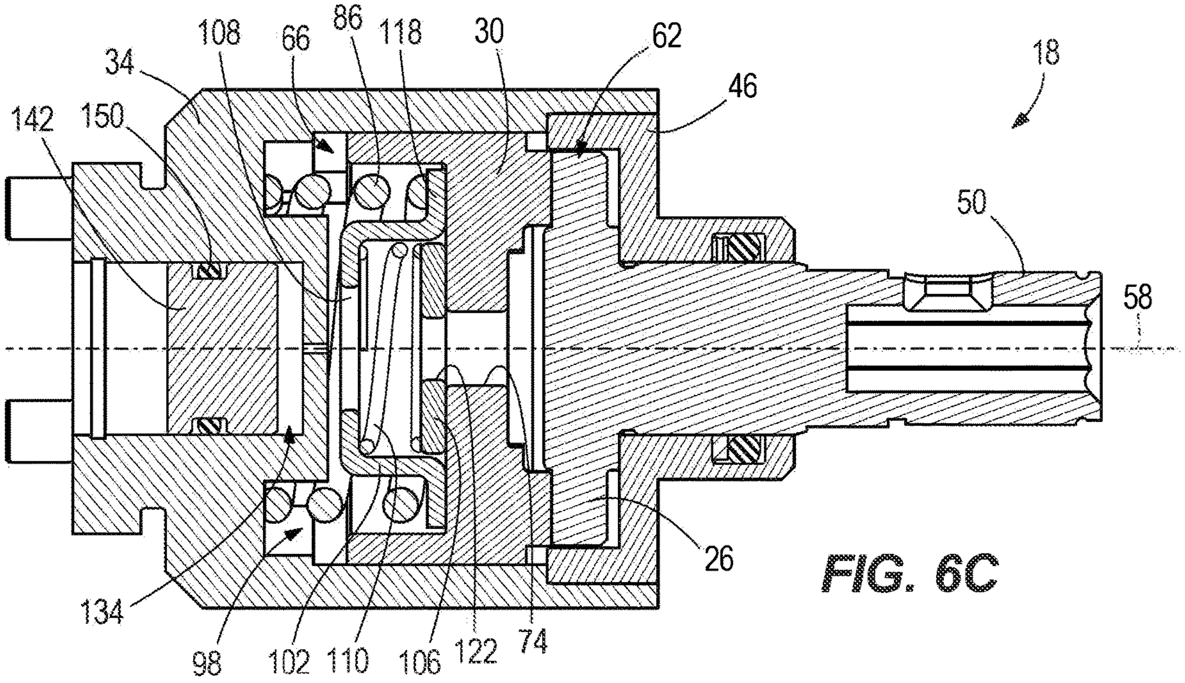

During operation of the impulse driver 10, the hammer 30 and the cylinder 34 rotate together and the hammer lugs 70 rotationally impact the corresponding anvil lugs 78 to impart consecutive rotational impacts to the anvil 26 and the output shaft 50. When the anvil 26 stalls, the hammer lugs 70 ramp over and past the anvil lugs 78, causing the hammer 30 to translate away from the anvil 26 against the bias of the hammer spring 86. FIG. 5 illustrates an overview of a hammer retraction phase, and FIGS. 6A-6C illustrate stepwise operation of the retraction phase. FIG. 6A illustrates the impulse assembly 18 when the hammer lugs 70 first contact the anvil lugs 78. FIG. 6B illustrates the impulse assembly 18 when the hammer 30 begins to translate away from the anvil 26. As the hammer 30 moves away from the anvil 26, the hydraulic fluid in the chamber 42 on the first side 62 of the hammer 30 is at a low pressure while the hydraulic fluid in the chamber 42 on the second side 66 of the hammer 30 is at a high pressure (FIG. 5). In addition, the valve assembly 98 translates with the hammer 30, away from the anvil 26. The hydraulic fluid flows from the second side 66 to the first side 62 by traveling through the central aperture 122 of the disc 106 and the hammer aperture 74. At the end of the retraction phase (FIG. 6C), the hammer spring 86 is compressed and the hammer lugs 70 have almost rotationally cleared the anvil lugs 78.

Figure 7A:
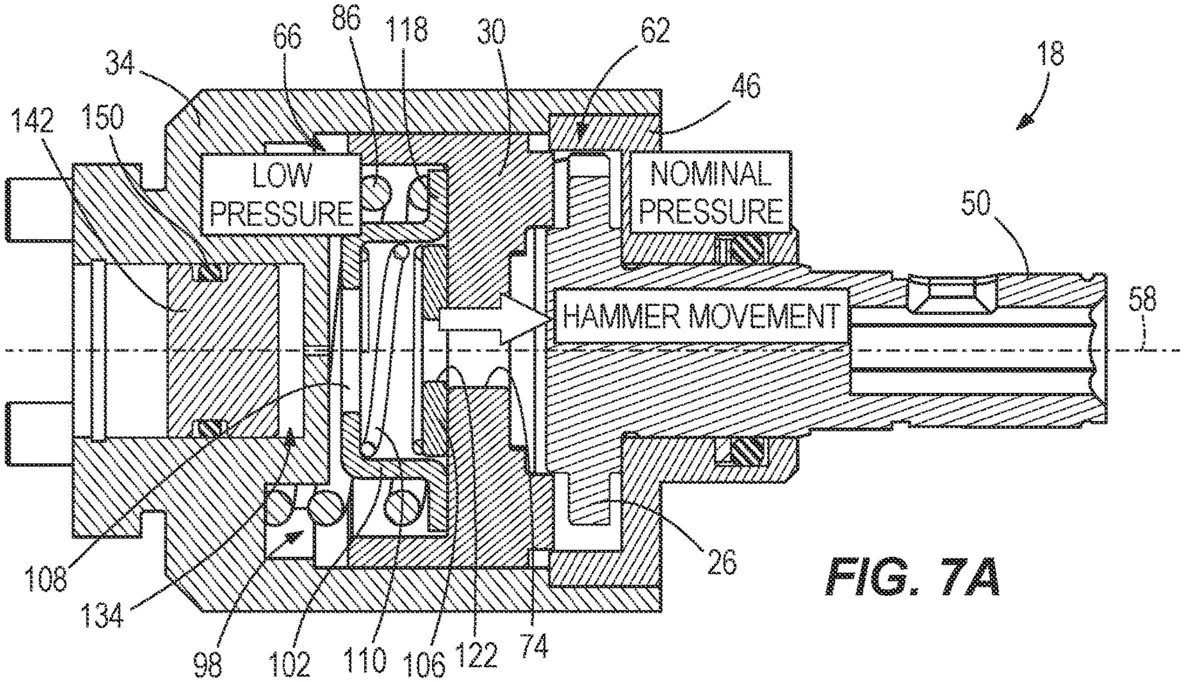
FIGS. 7A-7C are cross-sectional views of the impulse assembly of FIG. 2, illustrating operation of a return phase, according to some embodiments.
Figure 7B:
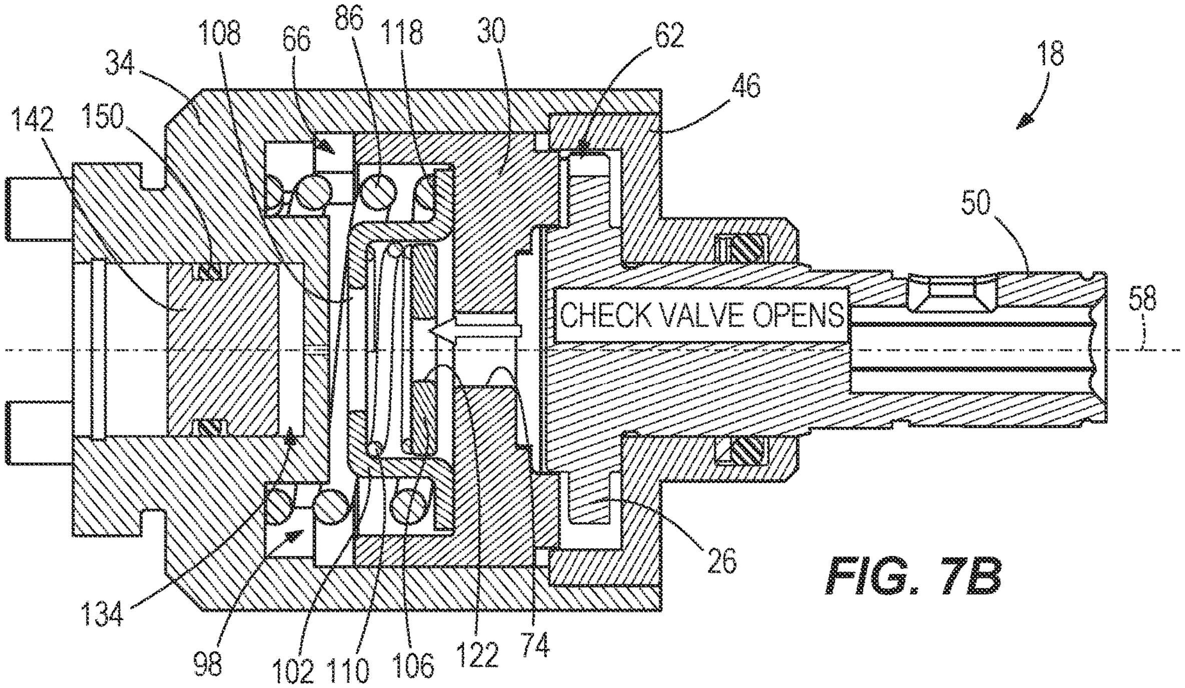
Figure 7C:
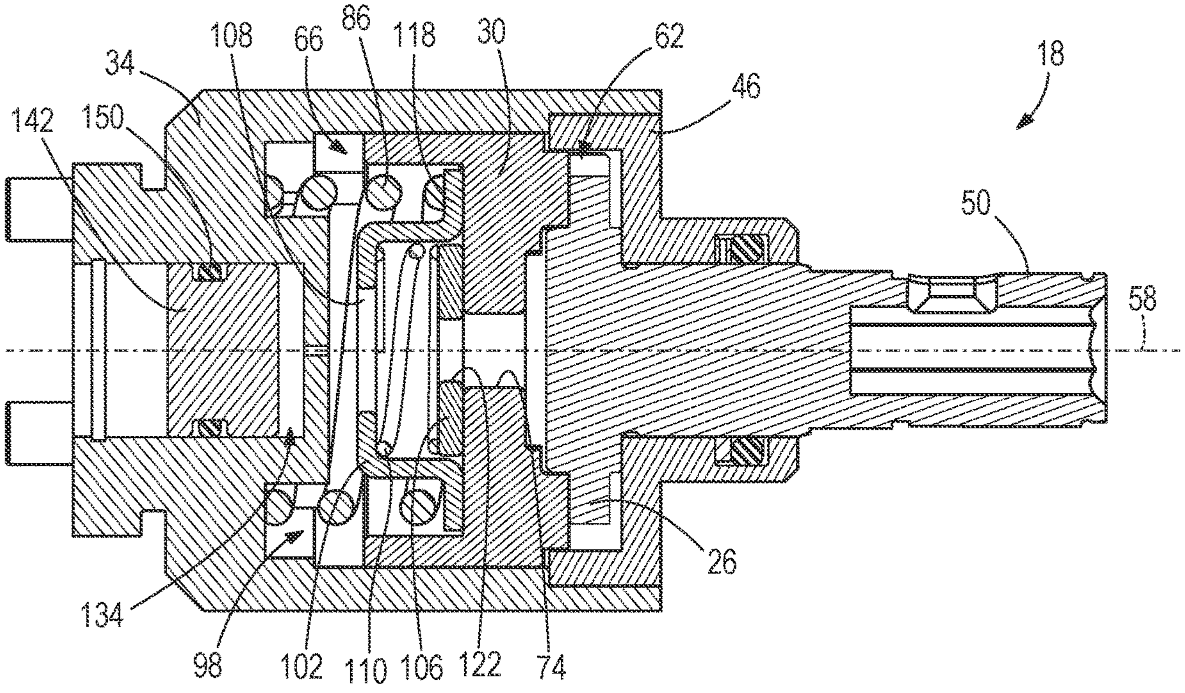

Once the hammer lugs 70 rotationally clear the anvil lugs 78, the spring 86 biases the hammer 30 back towards the anvil 26 in a hammer return phase (FIG. 7A-7C). FIG. 7A illustrates the impulse assembly 18 when the hammer 30 begins to translate toward the anvil 26. As the hammer 30 moves toward the anvil 26, the hydraulic fluid in the chamber 42 on the first side of the hammer 30 is at a nominal pressure while the hydraulic fluid in the chamber 42 on the second side 66 of the hammer 30 is at a low pressure (FIG. 7A). FIG. 7B illustrates the impulse assembly 18 with the valve assembly 98 in the open state as the hammer 30 translates toward the anvil 26. The hammer spring 86 keeps the flange 118 of the valve housing 102 in contact with the rear surface 130 of the hammer 30 as the disc 106 separates from the rear surface 130 due to the pressure differential between the two sides 62, 66 of the hammer 30. With the valve disc 106 unseated from the hammer 30, the auxiliary openings 126 are placed in fluid communication with the hammer aperture 74, thereby providing for additional fluid flow through the valve assembly 98. In other words, the disc 106 deflects away from the hammer 30 as the hammer 30 is returning toward the anvil 26, which creates additional fluid flow through the valve assembly 98. Once the hammer 30 has axially returned to the anvil 26, the valve assembly 98 returns to the closed state (FIG. 7C), and the impulse assembly is ready to begin another impact and hammer retraction phase. In other words, when the hammer 30 has returned, the pressure on both sides 62, 66 of the hammer 30 has equalized and the disc 106 is re-seated against the rear surface 130 of the hammer 30 by the bias of the valve spring 110. As such, the valve assembly 98 provides for additional fluid flow through the valve assembly 98 when the hammer 30 is returning toward the anvil 26 in order to more quickly reset the hammer 30 for the next impact cycle. In other words, the valve assembly 98 reduces the amount of time it takes to complete an impact cycle.

Figure 7D:
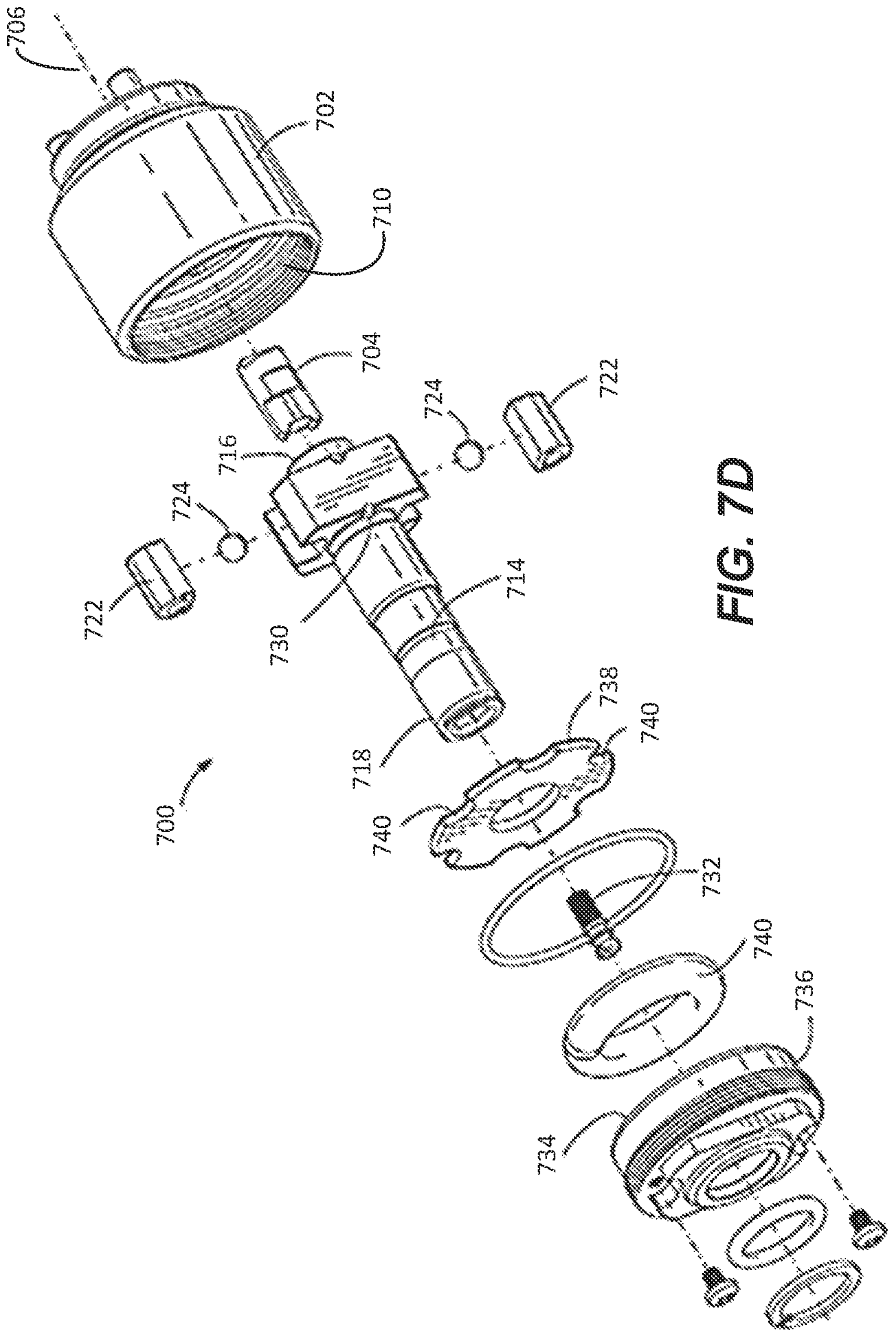
FIG. 7D is an exploded view of an impulse assembly, according to some embodiments.

Turning now to FIG. 7D, an exploded view of an alternative embodiment of a hydraulic impulse assembly 700 is shown, according to some embodiments. The impulse assembly 700 may be used in place of the impulse assembly 18, for example, in the impulse driver 10 and impulse tool 800. The impulse assembly 700 includes a cylinder 702 coupled for co-rotation with an output of a transmission and is arranged to rotate within a transmission housing 703, such as the transmission housings described herein. The impulse assembly 700 also includes a camshaft 704, the purpose of which is explained in detail below, attached to the cylinder 702 for co-rotation therewith about a longitudinal axis 706. Although the camshaft 704 is shown as a separate component from the cylinder 702, the camshaft 704 may alternatively be integrally formed as a single piece with the cylinder 702.

Figure 7E:
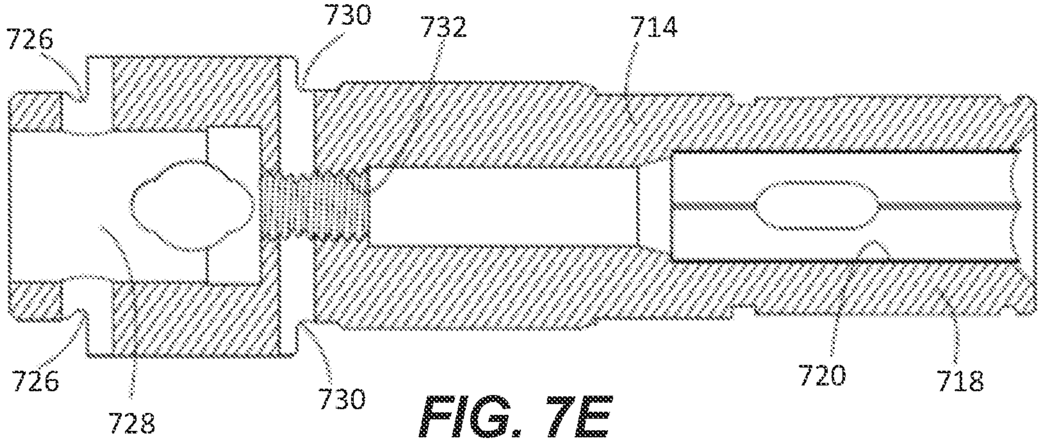
FIG. 7E is a cross-sectional view of an output shaft of the impulse assembly shown in FIG. 7D, according to some embodiments.
Figure 7F:
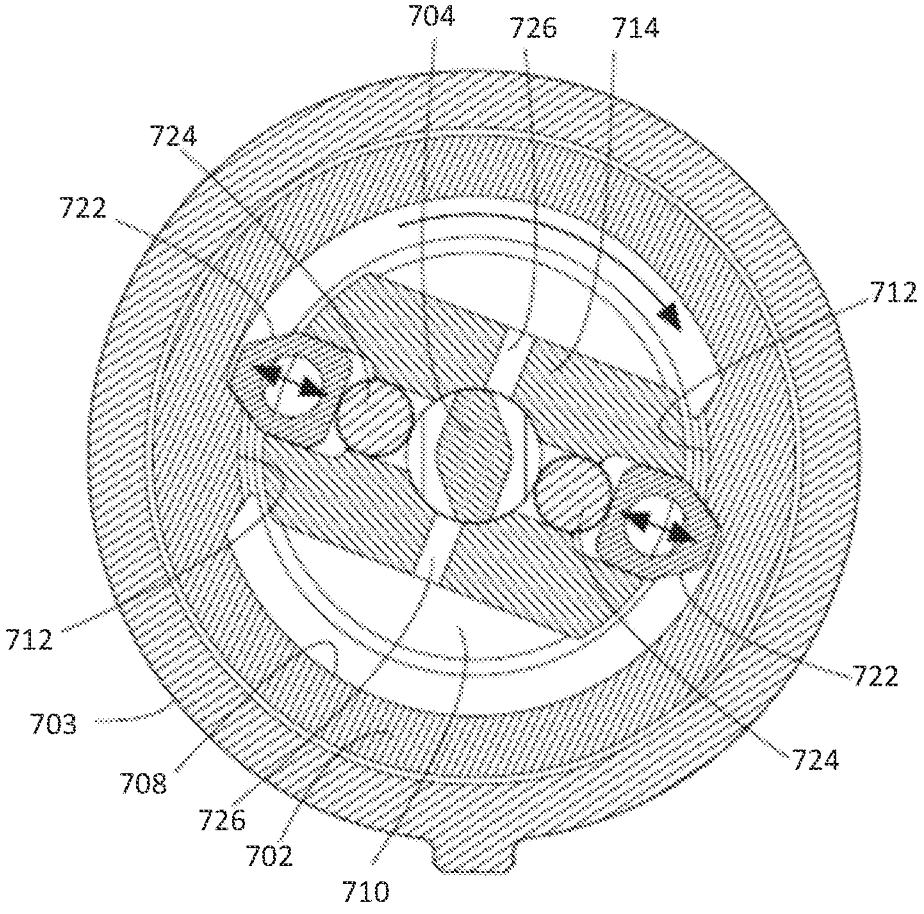
FIG. 7F is an assembled cross-sectional view of the impulse assembly shown in FIG. 7D, according to some embodiments.

With reference to FIG. 7F, the cylinder 702 includes a cylindrical interior surface 708, which partly defines a cavity 710, and a pair of radially inward-extending protrusions 712 extending from the interior surface 708 on opposites sides of the longitudinal axis 706. In other words, the protrusions 712 are spaced from each other by 180 degrees. The impulse assembly 700 further includes an output shaft 714 (FIG. 7E), a rear portion 716 of which is disposed within the cavity 46 and a front portion 718 of which extends from the transmission housing 703 with a hexagonal receptacle 720 therein for receipt of a tool bit. The impulse assembly 700 also includes a pair of pulse blades 722 protruding from the output shaft 714 to abut the interior surface 708 of the cylinder 702 and a pair of ball bearings 724 are positioned between the camshaft 716 and the respective pulse blades 722. The output shaft 714 has dual inlet orifices 726, each of which extends between and selectively fluidly communicates with the cavity 710 and a separate high pressure cavity 728 within the output shaft 714. The output shaft 714 also includes dual outlet orifices 730 that are variably obstructed by an orifice screw 732, thereby limiting the volumetric flow rate of hydraulic fluid that may be discharged from the output shaft cavity 728, through the orifices 730, and to the cylinder cavity 710. The camshaft 704 is disposed within the output shaft cavity 728 and is configured to selectively seal the inlet orifices 726.

The cavity 710 is in communication with a bladder cavity 734, defined by an end cap 736 attached for co-rotation within the cylinder 702 (collectively referred to as a "cylinder assembly"), located adjacent the cavity 710 and separated by a plate 738 having apertures 740 for communicating hydraulic fluid between the cavities 710, 734. A collapsible bladder 740 (FIG. 7D) having an interior volume filled with a gas, such as air at atmospheric temperature and pressure, is positioned within the bladder cavity 734. The bladder 740 is configured to be collapsible to compensate for thermal expansion of the hydraulic fluid during operation of the impulse assembly 700, which can negatively impact performance characteristics.

The collapsible bladder 740 can be formed from rubber or any other suitable elastomer. As one example, the collapsible bladder 740 is formed from Fluorosilicone rubber, having a Shore A durometer of 75+/−5. To form the collapsible bladder 740, the rubber is extruded to form a generally straight, hollow tube with opposite open ends. The hollow tube then undergoes a post-manufacturing vulcanizing process, in which the open ends are also heat-sealed or heat-staked to close both ends. In this manner, the opposite ends are closed without leaving a visible seam where the open ends had previously existed, and without using an adhesive to close the two previously-open opposite ends. During the sealing process, a gas, such as air at atmospheric temperature and pressure, is trapped within the interior volume defined between a first closed end and a second closed end of the collapsible bladder 740. However, the interior volume may be filled with other gasses. Because the closed ends are seamless, gas in the interior volume cannot leak through the closed ends, and the likelihood that the closed ends reopen after repeated thermal cycles of the hydraulic fluid in the cavities is very low.

In operation, upon activation of a motor of an impulse tool, as described above, torque from the motor is transferred to the cylinder 702 via the transmission, thereby causing the cylinder 702 and the camshaft 704 to rotate in unison relative to the output shaft 714 until the protrusions 712 on the cylinder 702 impact the respective pulse blades 722 to deliver a first rotational impact to the output shaft 714 and the workpiece (e.g., a fastener) upon which work is being performed. Just prior to the first rotational impact, the inlet orifices 726 are blocked by the camshaft 704, thus sealing the hydraulic fluid in the output shaft cavity 728 at a relatively high pressure, which biases the ball bearings 724 and the pulse blades 722 radially outward to maintain the pulse blades 722 in contact with the interior surface 708 of the cylinder 702. For a short period of time following the initial impact between the protrusions 712 and the pulse blades 722 (e.g. 1 ms), the cylinder 702 and the output shaft 714 rotate in unison to apply torque to the workpiece.

Also at this time, hydraulic fluid is discharged through the output orifices 730 at a relatively slow rate determined by the position of the orifice screw 732, thereby damping the radial inward movement of the pulse blades 722. Once the ball bearings 724 have displaced inward by a distance corresponding to the size of the protrusions 712, the pulse blades 722 move over the protrusions 712 and torque is no longer transferred to the output shaft 714. The camshaft 704 rotates independently of the output shaft 714 again after this point, and moves into a position where it no longer seals the inlet orifices 726 thereby causing fluid to be drawn into the output shaft cavity 728 and allowing the ball bearings 724 and the pulse blades 722 to displace radially outward once again. The cycle is then repeated as the cylinder 702 continues to rotate, with torque transfer occurring twice during each 360 degree revolution of the cylinder. In this manner, the output shaft 714 receives discrete pulses of torque from the cylinder 702 and is able to rotate to perform work on a workpiece (e.g., a fastener).

Figure 8:
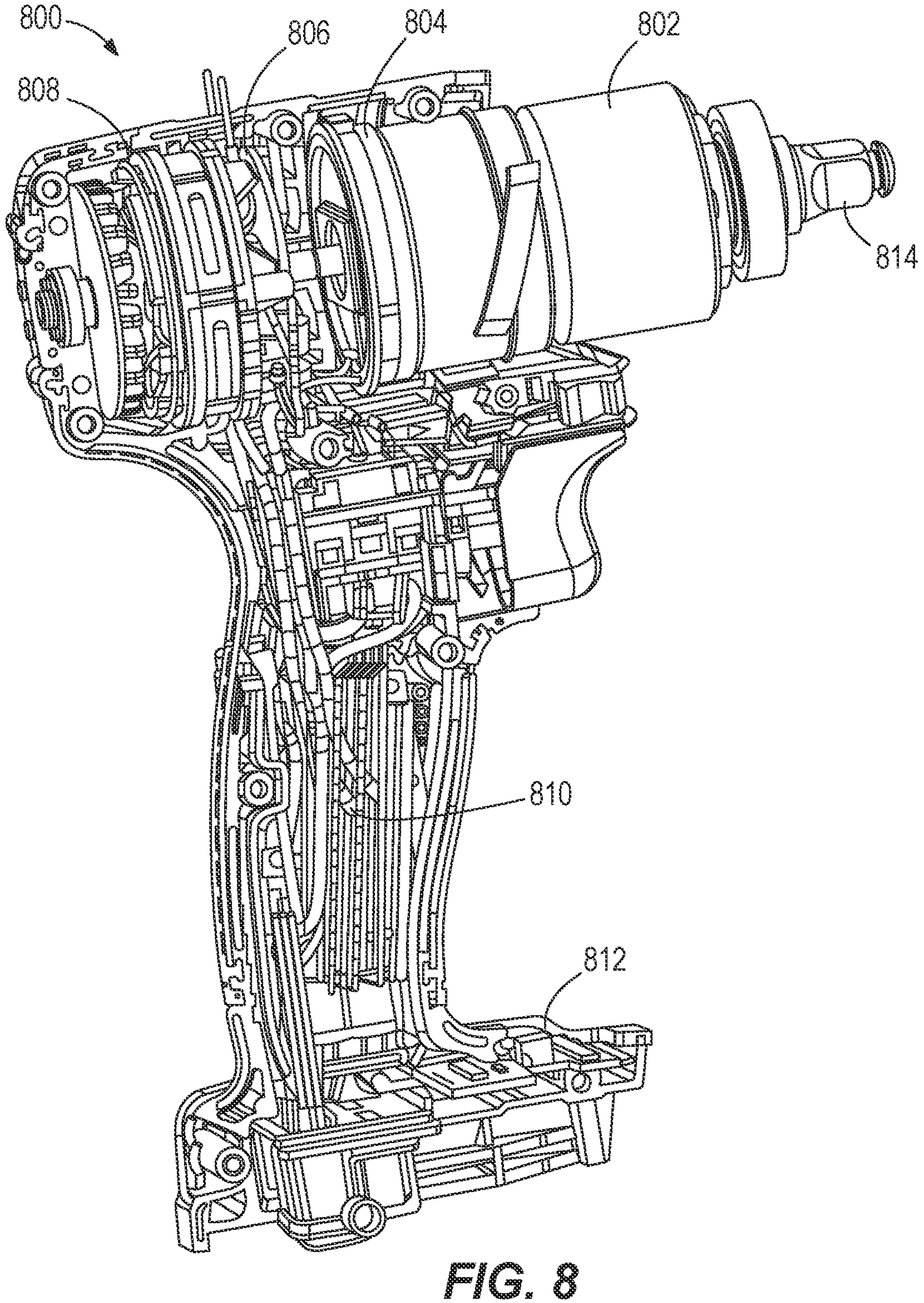
FIG. 8 is a perspective view of the impulse power tool of FIG. 1B with a portion of the housing removed, illustrating the internal components of the tool, according to some embodiments.

Turning now to FIG. 8, the impulse tool 800 shown in FIG. 1B is shown with a portion of a housing 801 removed. The impulse tool 800 includes an impulse assembly 802, a transmission 804, a speed sensor 806, a motor 808, a power driver circuit 810, a controller 812, and an output spindle 814. In one embodiment, the impulse assembly 802 has the same construction, configuration and functionality as the impulse assembly 18, described above. In some examples, the impulse assembly 802 may be constructed on a different scale than the impulse assembly 18, but will maintain the same construction, components, and functionality as impulse assembly 18, described above. In other embodiments, the impulse assembly 802 may have the same construction, configuration, and functionality as the hydraulic impulse assembly 700, described above. The transmission 804 is positioned between the motor 808 and the impulse assembly 802 and is configured to transmit torque from the motor 808 to the impulse assembly 802. In one embodiment, the motor 808 is a brushless direct current motor, for example, having an inner permanent magnet rotor and outer stator coil windings.

The speed sensor 806 is configured to determine a speed of the motor 808. In some examples, the speed sensor 806 may be an encoder, one or more Hall sensors, etc. In one embodiment, the speed sensor 806 includes one or more Hall effect sensors mounted on a printed circuit board that is axially adjacent to the rotor. The Hall effect sensors can detect a change in a magnetic field of the motor 808, and determine a speed of the motor based on the changes in the magnetic field. For example, the rotor of the motor may include one or more magnets that generate a magnetic field, which is sensed when each magnet passes by the one or more Hall effect sensors. For example, the magnets may be rotor magnets of the motor. The Hall effect sensor can then determine a speed of the motor based on the frequency of the magnets passing by the Hall effect sensors. In one embodiment, the speed sensor 806 includes circuitry to generate a speed value of the motor based on the feedback from the one or more sensors (e.g. Hall effect sensors). This speed value may then be presented to the controller 812 and the controller 812, thereby, determines the speed value. In other embodiments, the speed sensor 806 may provide raw data (e.g. data from the Hall effect sensors) directly to the controller 812. For example, each Hall effect sensor may generate an indication (e.g., a pulse) when a magnet passes across a face of the Hall effect sensor. The controller 812 may then be configured to determine a speed of the motor by calculating the speed value based on the raw data from the speed sensor 806. The controller 812 may further be configured to determine additional information about the motor 808 from the raw data from the speed sensor 806, such as position, velocity, and/or acceleration of a rotor of the motor.

However, in some embodiments, the speed may be determined without the use of a speed sensor. For example, the controller 812 may be configured to determine motor speed based on back electromagnetic force (BEMF) generated by the motor 808 during operation. BEMF is a voltage directly related to the speed of the motor 808. It is generated when a coil of the motor 808 is exposed to a time changing magnetic field. For example, the rotor of the motor 808 may include one or more magnets that generate a magnetic field and the motor 808 may include one or more coils exposed to the generated magnetic field. As the rotor moves past the coils, a BEMF voltage is generated in the opposite direction as current flows through the coils. For example, the motor 808 could be accelerated to a constant speed. Power (e.g. voltage) may then be briefly removed from the coils of the motor 808, thereby allowing the mechanical inertia to continue the motor rotation. During this coast period, a BEMF voltage is generated. The BEMF voltage may range between 0V and a driving voltage level that is proportional to the rated speed of the motor 808. Each coil of the motor 808 generates a separate BEMF voltage. The BEMF voltage may then be provided to the controller 812. The controller 812 may then determine a speed value based on the provided BEMF voltage. The controller 812 may further be configured to determine additional information about a motor, such as motor 808, from the BEMF voltage(s), such as motor position, rotor velocity, and/or rotor acceleration.

The power driver circuit 810 is configured to control the power from a power source (e.g. battery) to the motor 808. The power driver circuit 810 may include one or more field effect transistors (FET) on a printed circuit board. The FETs are configured to control the power from the power source (e.g. the battery) that is provided to the motor 808. For example, the FETs may form a switch bridge that receives power from the power source and that is controlled by the controller 812 to selectively energize the stator winding coils to generate magnetic fields that drive the rotor magnets to rotate the rotor. In some embodiments, the controller 812 is configured to control the FETs based on data from the Hall sensors of the speed sensor 806 indicative of rotor position. The power driver circuit 810 may be configured to control a speed and/or a direction of the motor 808 by controlling the power provided to the motor 808.

Figure 9:
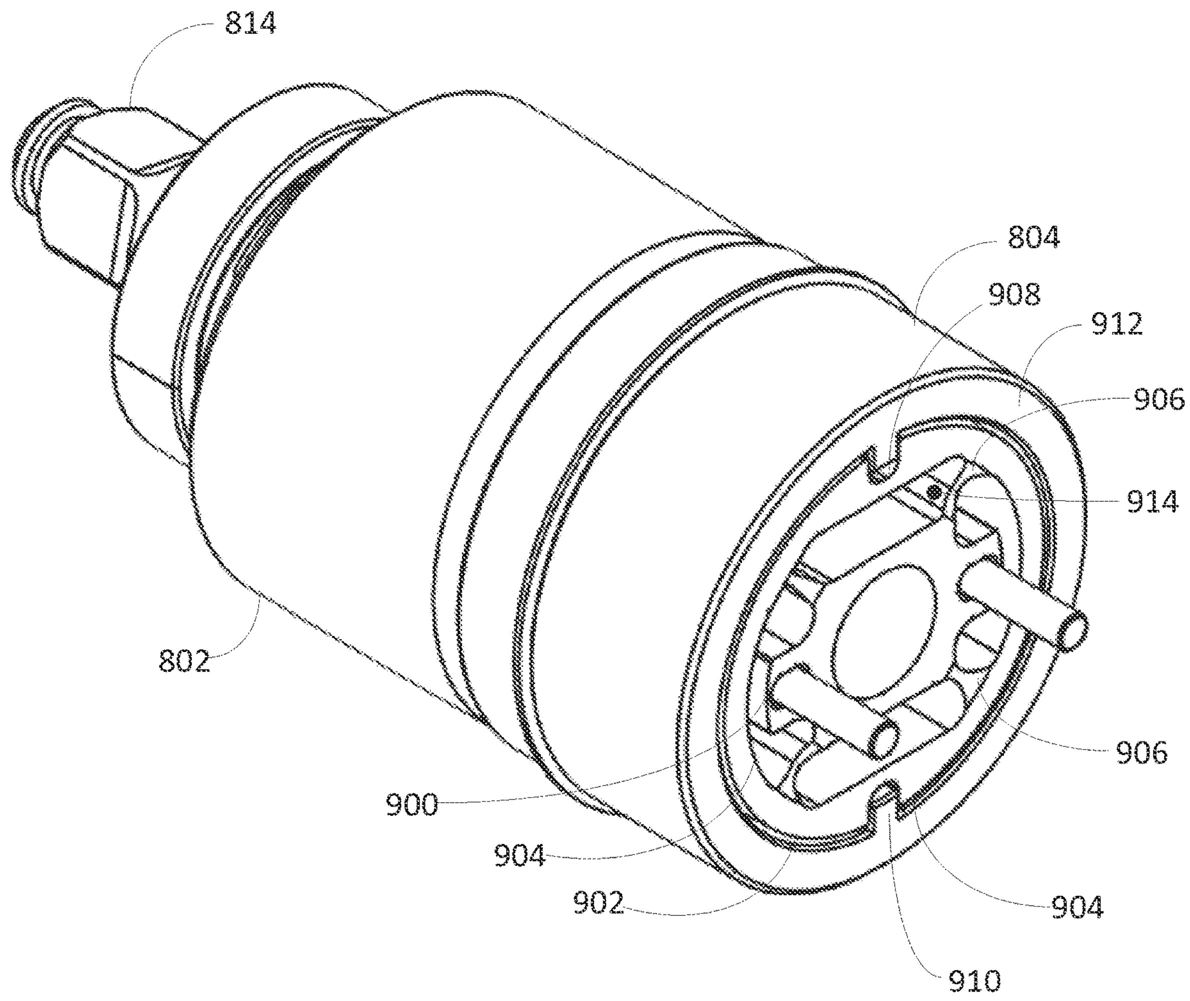
FIG. 9 is a perspective view of an impulse assembly of the impulse power tool of FIG. 1B, according to some embodiments.

Turning now to FIG. 9, the impulse assembly 802 and the transmission 804 are shown separate from the impulse tool 800. The transmission 804 includes a torque transducer 900 that is configured to measure an amount of torque applied to the impulse assembly 802. In one embodiment, the torque transducer 900 includes an outer rim 902, an inner hub 904, and multiple webs 906 interconnecting the outer rim 902 and the inner hub 904. In one embodiment the webs 906 are angularly spaced apart in equal increments of 90 degrees. Generally, the thickness of the webs 906 is less than the thickness of the outer rim 902. With reference to FIG. 9, the outer rim 902 of the torque transducer 900 is generally circular and defines a circumference interrupted by a pair of radially inward-extending slots 908. Although the illustrated transducer 900 includes a pair of slots 908 in the outer rim 902, more than two slots 908 or fewer than two slots 908 may alternatively be defined in the outer rim 902. In one embodiment, the inward-extending slots 908 are configured to interface with one or more inward-extending protrusions 910 positioned in a cavity of a ring gear 912 of the transmission 804. Although the illustrated housing 912 includes a pair of inward-extending protrusions 910, the housing 912 may include more or fewer than two inward-extending protrusions 910. However, the number and position of the inward-extending protrusions 910 is equal to the one or more slots 908 on the torque transducer 900. The radially inward-extending protrusions 910 on the ring gear 912 are partially received within the respective inward-extending slots 908. In other words, the radially inward-extending protrusions 910 and the inward-extending slots 908 are shaped to provide physical contact between the protrusions 910 and the slots 908 along a line coinciding with a thickness of the outer rim 902.

In one embodiment, the torque transducer 900 is secured within the transmission 804 using a pressfit or interference fit coupling. In other embodiments, the torque transducer 900 is secured within the transmission 804 via one or more pins, screws, or other fastening components to create an interference between the torque transducer 900 and the transmission 804. In still further embodiments, the torque transducer 900 is secured within the transmission 804 using a bonding material, such as epoxy, glue, thread locker, resin, etc. Further, while the above torque transducer 900 is described as being located within the transmission 804, in some embodiments, the torque transducer 900 may be mounted to a stator associated with the motor 808.

The torque transducer 900 includes one or more sensors 914 (e.g. a strain gauge) coupled to each of the webs 906 (e.g., by using an adhesive) for detecting strain experienced by the webs 906. However, in some embodiments, one or more sensors 914 may be coupled to only a single web 906 of the torque transducer 900. As described in further detail below, the strain gauges 914 electrically connected on one or more other devices, such as the controller 812, for transmitting respective signals (e.g. voltage, current, etc.) generated by the strain gauges 914 that are proportional to the magnitude of strain experienced by the respective webs 906. These signals may be calibrated to a measure of reaction torque applied to the outer rim 902 of the torque transducer 900 during operation of impulse tool 800, which may be indicative of the torque applied to a workpiece (e.g., a fastener) by the output spindle 814.

During operation, when the motor 808 is activated, torque is transferred from the motor 808, through the transmission 804 and the impulse assembly 802, and to the output spindle 814 for rotating a tool bit attached to the output spindle 814. When the tool bit is engaged with and driving a workpiece (e.g., a fastener), a reaction torque is applied to the output spindle 814 in an opposite direction as the output spindle 814 is rotating. This rotation torque is transferred through one or more planetary stages of the transmission 804 to the ring gear 912, where it is applied to the outer rim 902 of the transducer 900 by force components FR, which are equal in magnitude, radially offset from a central axis by the same amount.

As the reaction torque applied to the ring gear 912 increases, the magnitude of the force components FR also increases, eventually causing the webs 906 to deflect and the outer rim 902 to be displaced angularly relative to the inner hub 904 by a small amount. As the magnitude of the force components FR continues to increase, the deflection of the webs 906 and the relative angular displacement between the outer rim 902 and the inner hub 904 progressively increases. The strain experienced by the webs 906 as a result of being deflected is detected by the strain gauges 914 which, in turn, output respective voltage signals to the controller 812. As described above, these signals are calibrated to indicate a measure of the reaction torque applied to the outer rim 902 of the torque transducer 900, which is indicative of the torque applied to the workpiece by the output spindle 814. For example, the amplitude of the voltage signals may be proportional to, or have another known relationship with, the amount of reaction torque. For further description of an example torque transducer that may be included in the tool 10 and tool 800, see U.S. patent application Ser. No. 15/138,962 filed on Apr. 26, 2016 (also U.S. Patent Application Publication No. 2016/0318165), the entire content of which is incorporated herein by reference.

Figure 10:
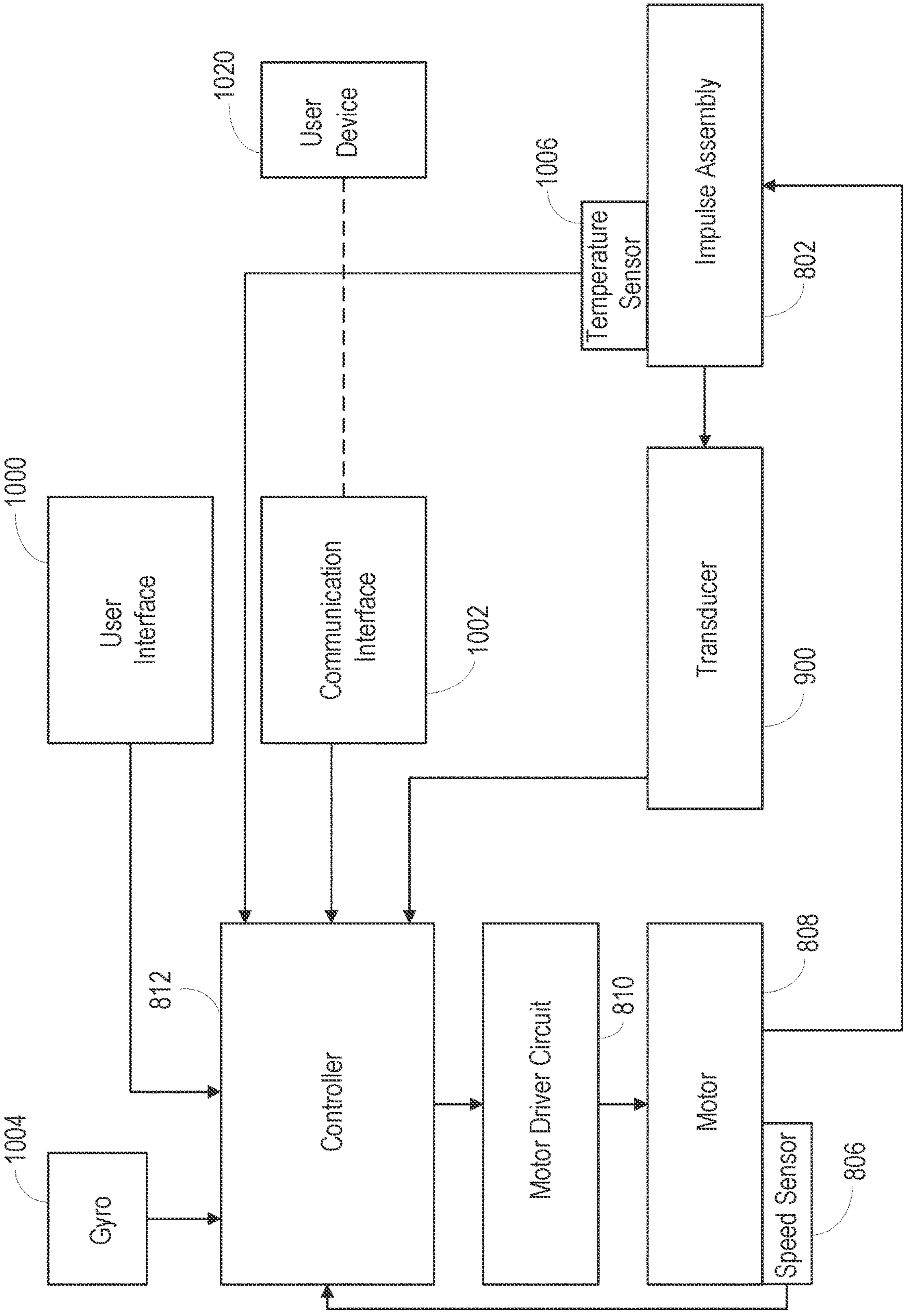
FIG. 10 is a block diagram of the impulse power tool of FIG. 1B, according to some embodiments.

Turning now to FIG. 10, a block diagram of the impulse tool 800 is shown, according to some embodiments. As described above, the impulse tool includes an impulse assembly 802, a speed sensor 806, a motor 808, a motor driver circuit 810, a controller 812, and a torque transducer 900. The impulse tool 800 may further include a user interface 1000, a communication interface 1002, a motion sensor, such as a gyroscopic sensor 1004, and a temperature sensor 1006. The impulse assembly 802, the speed sensor 806, the motor 808, and the motor driver circuit 810 have the same functionality as described above.

The controller 812 may be configured to communicate with one or more of the above components, either directly or indirectly. The controller 812 may include one or more electronic processors, such as programmed microprocessors, application specific integrated circuits (ASIC), one or more field programmable gate arrays (FPGA), a group of processing components, or other suitable electronic processing components. The controller 812 may further include a memory (e.g. memory, memory unit, storage device, etc.) for storing data and/or computer code for completing or facilitating the various processes, layers, and modules described herein. The memory may include one or more devices, such as RAM, ROM, Flash memory, hard disk storage, etc.

The user interface 1000 may include various components that allow a user to interface with the impulse tool 800. For example, the user interface 1000 may include a trigger, a mode selector, or other user accessible controls that can generate control signals in response to the user actuating or operating the associated component of the user interface 1000. In some embodiments, the user interface 1000 may include a display or other visual indicating device that may provide a status of the impulse tool 800, such as an operating status, a battery charge status, a locked/unlocked status, a torque setpoint, a torque output, etc. In other embodiments, the user interface 1000 includes an interface to allow for a user to input or modify parameters of the impulse tool 800. For example, the user interface 1000 may be configured to allow a user to input a desired torque value (e.g. a desired torque value applied to a fastener) via the user interface 1000. For example, the user interface 1000 may include one or more inputs, such as dials, DIP switches, pushbuttons, touchscreen displays, etc., which may all be used receive an input from a user. In some examples, the inputs may be provided via the communication interface 1002, as described below. The user interface 1000 may be configured to display inputs received via other components, such as the communication interface 1002, to allow the user to verify that the desired settings were received by the impulse tool 800. For example, the user interface 1000 may include various displays, such as LCD, LED, OLED, etc., which can provide an indication to a user of one or more parameters associated with the impulse tool 800.

The communication interface 1002 is configured to facilitate communications between the controller 812 and one or more external devices and/or networks. The communication interface 1002 can be or include wired or wireless communication interfaces (e.g., jacks, antennas, transmitters, receivers, transceivers, wire terminals, etc.) for conducting data communications between the tool 800 and one or more external devices described herein. In some embodiments, the communication interface 1002 includes a wireless communication interface such as cellular (3G, 4G, LTE, CDMA, 5G, etc.), Wi-Fi, Wi-MAX, ZigBee, ZigBee Pro, Bluetooth, Bluetooth Low Energy (BLE), RF, LoRa, LoRaWAN, Near Field Communication (NFC), Radio Frequency Identification (RFID), Z-Wave, 6LoWPAN, Thread, WiFi-ah, and/or other wireless communication protocols. Additionally, the communication interface 1002 may include wired interfaces such as a Universal Serial Bus (USB), USB-C, Firewire, Lightning, CATS, universal asynchronous receiver/transmitter (UART), serial (RS-232, RS-485), etc.

In some embodiments, the communication interface 1002 can be configured to communicate with one or more external user devices 1020. Example user devices may include smartphones, personal computers, tablet computers, dedicated tool interface devices, etc. These devices may communicate with the communication interface 1002 via the one or more of the above communication schemes. This can allow for the external device to both provide inputs to the impulse tool 800, and receive data from the impulse tool 800. For example, a user may be able to set various parameters for the impulse tool 800 via a software application associated with the impulse tool 800 on a user device 1020. The parameters may include desired fastening torque, maximum fastening torque, maximum speed, fastener types, operational profiles, etc. The received parameters may then be communicated to the controller 812 for storage and execution. Additionally, the user may be able to view one or more parameters associated with the tool via the software application, such as battery power levels, hours of operation, set fastening torque, etc.

As shown in FIG. 10, the controller 812 is also in communication with the torque transducer 900, the speed sensor 806, the temperature sensor 1006, and the gyroscopic sensor 1004. As described above, the torque transducer 900 is configured to provide data to the controller 812 indicative of a sensed torque. In one embodiment, the torque value provided by the torque transducer is indicative of the torque applied to the workpiece by the output spindle 814 of the impulse tool 800. In some embodiments, the output profile of the torque transducer 900 may be a bi-modal profile. In some embodiments, a peak detection algorithm is used to detect the height of the second peak, as the second peak is representative of the characteristic torque within the application. In some examples, the peak detection algorithm may be executed by the controller. However, in other embodiments, the peak detection algorithm may be executed by the torque transducer 900. In some embodiments, the peak detection algorithm may determine if the output of the torque transducer 900 is multimodal. In one embodiment, the controller 812 uses techniques such as evaluating standard peak times separated by a time threshold, a neural network, and the like to determine if the output of the torque transducer 900 is multimodal. If the output contains only a single peak, it may be suggestive of the fastener not being seated, or that the application is a hard joint. In other embodiments, if the output is determined to contain only a single peak, the controller 812 may utilize a logical state whereby the tool operates for a predefined number of further impulses (e.g. 5), wherein each of the future impulses contributes to a likely further state of seating even though each individual pulse (e.g. single peak) may not be descriptive enough of the ultimate torque.

In some embodiments, the torque transducer is used to determine the precise time an impulse occurs. In some examples, the timing of the impulses can be used to improve fastener and bolt seating. For example, the timing of the impulses may be combined with other sensed parameters such as motor speed and/or tool motion sensing to calculate the angle of the output. Additionally, other data provided by the torque transducer 900 may be analyzed (for example, by the controller 812), such as timing between impulses, duration of impulses, up-sloping derivative of torque, total integral of torque over time, etc.

In some implementations, a hard joint may be encountered when the tool is attempting to drive a fastener into the material. This can affect the quality of a torque reading produced by the torque transducer 900, as the impulses may be very short and not every impulse may be strong enough to do positive work on the application. In these applications, the controller 812 may detect the torque during the time period in which the torque from the torque transducer 900 is distinguishable, and then further rely on secondary criteria, such as number of pulses or total rotations, to verify the torque. In other examples, a moment of an impulse, combined with reaction force data from a gyroscope may allow an output rotation to be determined. In some embodiments, the amount of rotation could be an additional criteria of success (e.g. 50 degrees of rotation needed at a desired torque) of driving a fastener.

Figure 16A:
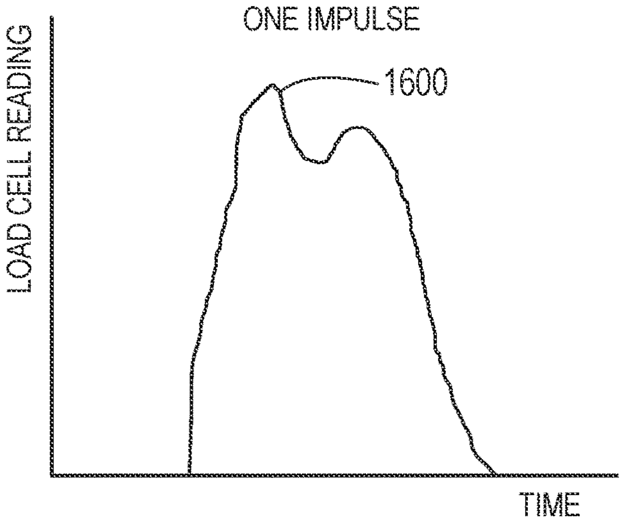
FIGS. 16A-F are graphical representations of measured output torque of an impulse power tool over time when seating a fastener.
Figure 16B:
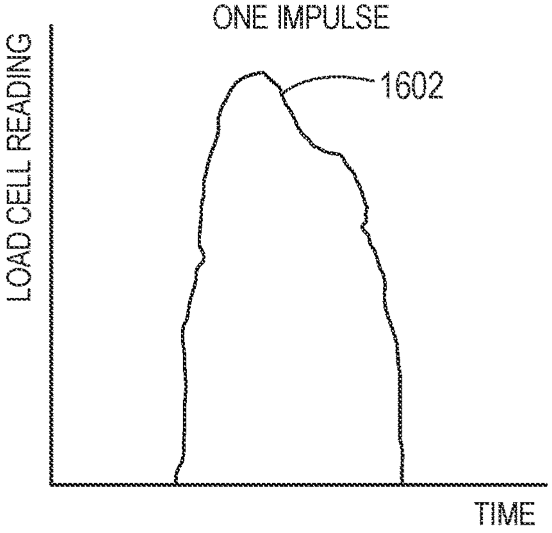
Figure 16C:
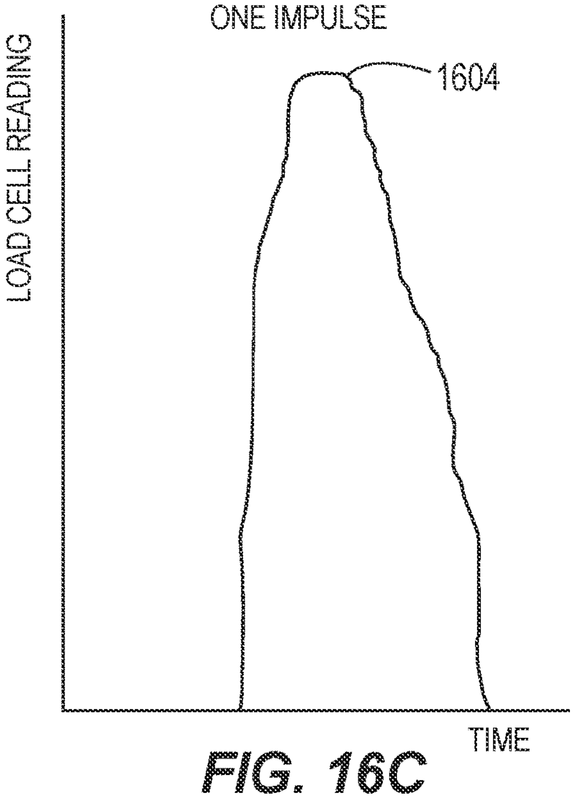

Turning to FIGS. 16A-C, torque pulses are illustrated as a joint goes from a soft joint to a hard joint. In FIG. 16A, the torque pulse 1600 is representative of a torque pulse for a soft pulse. As shown, the torque pulse shows two peaks, where the second peak is closer to an actual fastener torque than the first peak. This may be due to stiction and/or inertial effect. Turning to FIG. 16B, a torque pulse 1602 is shown as a joint becomes more hardened. Examples of a joint hardening may include knots or other harder portions of the material. In some embodiments, driving a fastener into hard material may result in a "kink" in the impulse tool from back forces due to a sudden hardness being encountered. As shown in 16B, the second peak is more difficult to discern when a kink or sudden hardening of the work material is encountered by the fastener. Thus, more sensitive detection methodologies, such as neural networks or other machine learning algorithms, evaluate parameters such as the median or percentile of values above a threshold, determine medians or percentiles within a portion of the pulse, and the like may be used to fully determine the second peak (e.g. the kink).

Figure 16D:
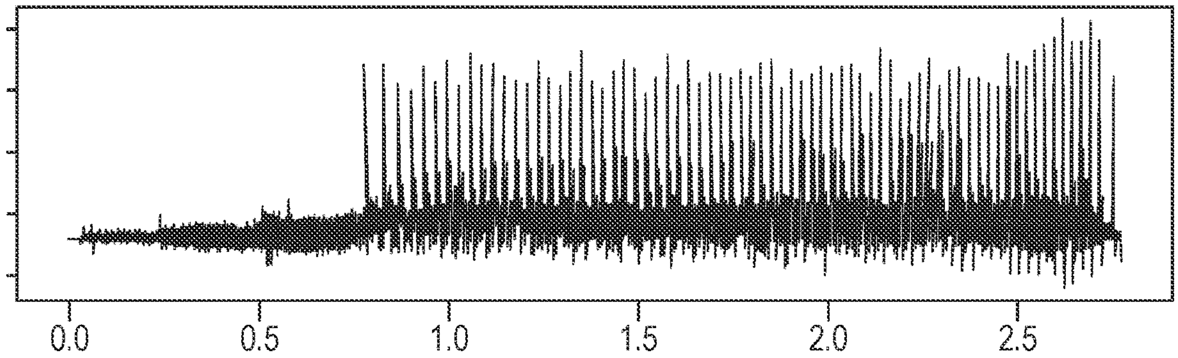
Figure 16E:
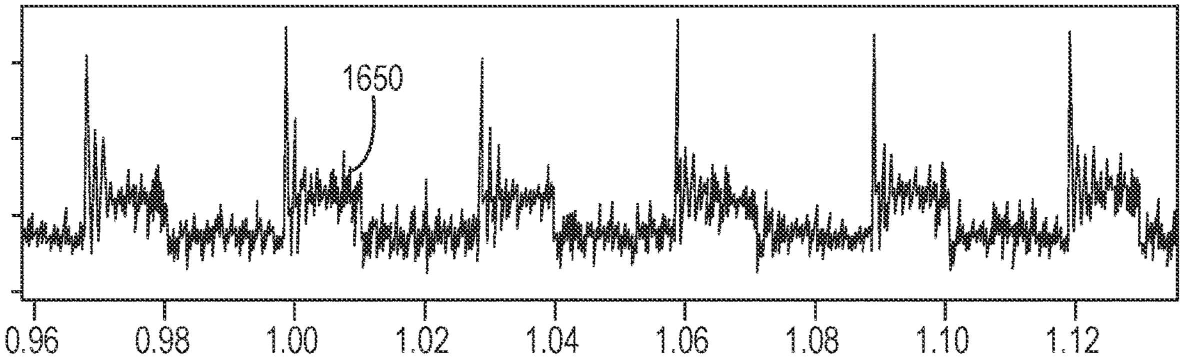
Figure 16F:
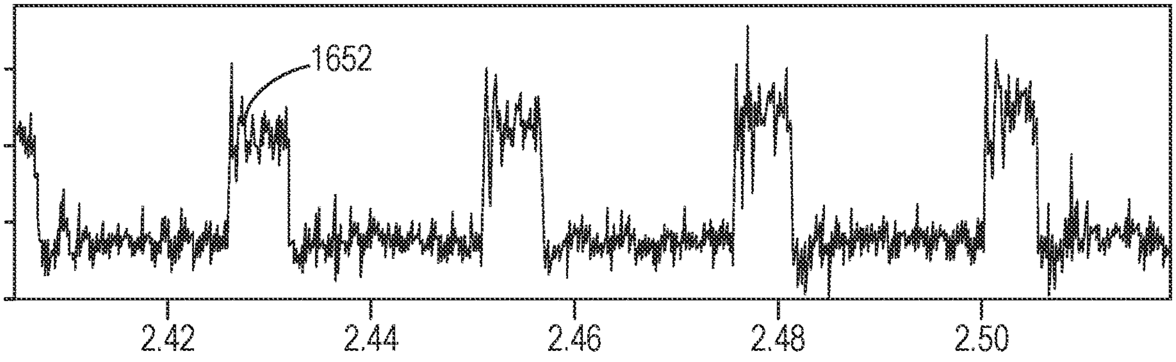

FIG. 16C is representative of a torque pulse 1604 during the driving of a fastener into a very hard joint. The torque pulse 1604 has little or no second peak, making torque determination more difficult. This can require additional calculations to be performed by the controller, such as estimation of additional torque, angle determinations, etc., as within the impulse 1604 there may not be enough signal to fully determine the torque. FIG. 16D illustrates an output of a torque transducer, such as torque transducer 900, when a fastener is driven into a soft joint. As shown in FIG. 16D, the torque increases over time as the fastener is driven further into the work material. FIG. 16E is a zoomed in portion of FIG. 16D showing the torque values as the torque begins to increase. As shown, the sustained torque value 1650 is rising with each impulse, highlighting the seating of the fastener. FIG. 16F is a second zoomed in portion of FIG. 16D, which shows the sustained torque value 1652 being more pronounced, thereby making measurements easier as the sustained portion is further above any noise in the system.

The speed sensor 806 provides an indication of the rotational speed of the motor 808, as described above. In some embodiments, the controller 812 may convert the motor speed to the speed of the output spindle 814. For example, the controller 812 may convert the motor speed to the output spindle speed based on a current setting or condition of the transmission. In other embodiments, the raw motor speed provided by the speed sensor 806 is used by the controller 812 as the speed of the impulse tool. While the speed sensor 806 is described as sensing the speed of the motor 808, it is contemplated that additional speed sensors may be located within the impulse tool 800 for providing other speed signals. For example, speed sensors may be located within the impulse tool 800 to provide a speed of the output spindle 814, or other rotating portions of the impulse tool 800.

The temperature sensor 1006 may provide an indication of the temperature of the impulse assembly 802. In one embodiment, the temperature of the impulse assembly 802 may be representative of a temperature of the fluid within the impulse assembly 802. The temperature data is communicated to the controller 812. In some examples, the temperature sensor 1006 may sense an ambient temperature. The controller 812 may use one or more conversion techniques (e.g. modeling, loop up table populated based on experimental test data) to estimate a temperature of the fluid in the impulse assembly 802 based on a usage pattern of the tool in combination with the ambient temperature sensed by the temperature sensor 1006.

The gyroscopic sensor 1004 may be configured to provide an indication of the movement of the impulse tool 800. For example, the gyroscopic sensor 1004 may be located in the handle of the impulse tool 800 to provide an indication of a reactive torque experienced by the impulse tool 800 during operation. The reactive torque is representative of a torque that may be felt by a user during operation of the tool. The gyroscopic sensor 1004 may further be configured to account for reactionary forces, torques, and/or energies that go into the body of the tool and coupled components such as batteries, adapters, and the user. The gyroscopic sensor 1004 may be used to derive a characteristic of tool systems, such as characteristic added inertia, characteristic stiffness, characteristic dampening, or other characteristic responses. The controller 812 may use the reactive torque information provided by the gyroscopic sensor 1004 to more accurately determine a torque transmitted by the tool to a fastener, as described in more detail below.

While the above motion sensor is described as the gyroscopic sensor 1004, the motion sensor could be an accelerometer, a magnetometer, or the like. In some examples, a motion sensor, as described above, may lose accuracy during high reactionary force loading or during rapid motions (such as capping out). This reduced accuracy may be due to the inertias of one or more planetary components within the ring gear during high accelerations (for example, pulses) and can have a significant effect on the readings captured by the motion sensor. Accordingly, in some embodiments, the motion sensor alternatively operates primarily when impulses are not occurring. By operating primarily when an impulse is not occurring, the angular speed difference before and after an impulse may be calculated using a simplistic modeled response (for example, based on a fixed mass and spring). This can allow for improving the relationship between the sensed torque on the ring and the torque applied to an external component (for example, a fastener). Additionally, the motion sensor may also be used to account for rotational speed of the tool along with positional differences of components with respect to the tool body versus an inertial reference frame. This may be important if the target torque criteria includes alternative criteria, such as a target number of fastener rotations to be reached after a minimum seating torque is reached.

Figure 11:
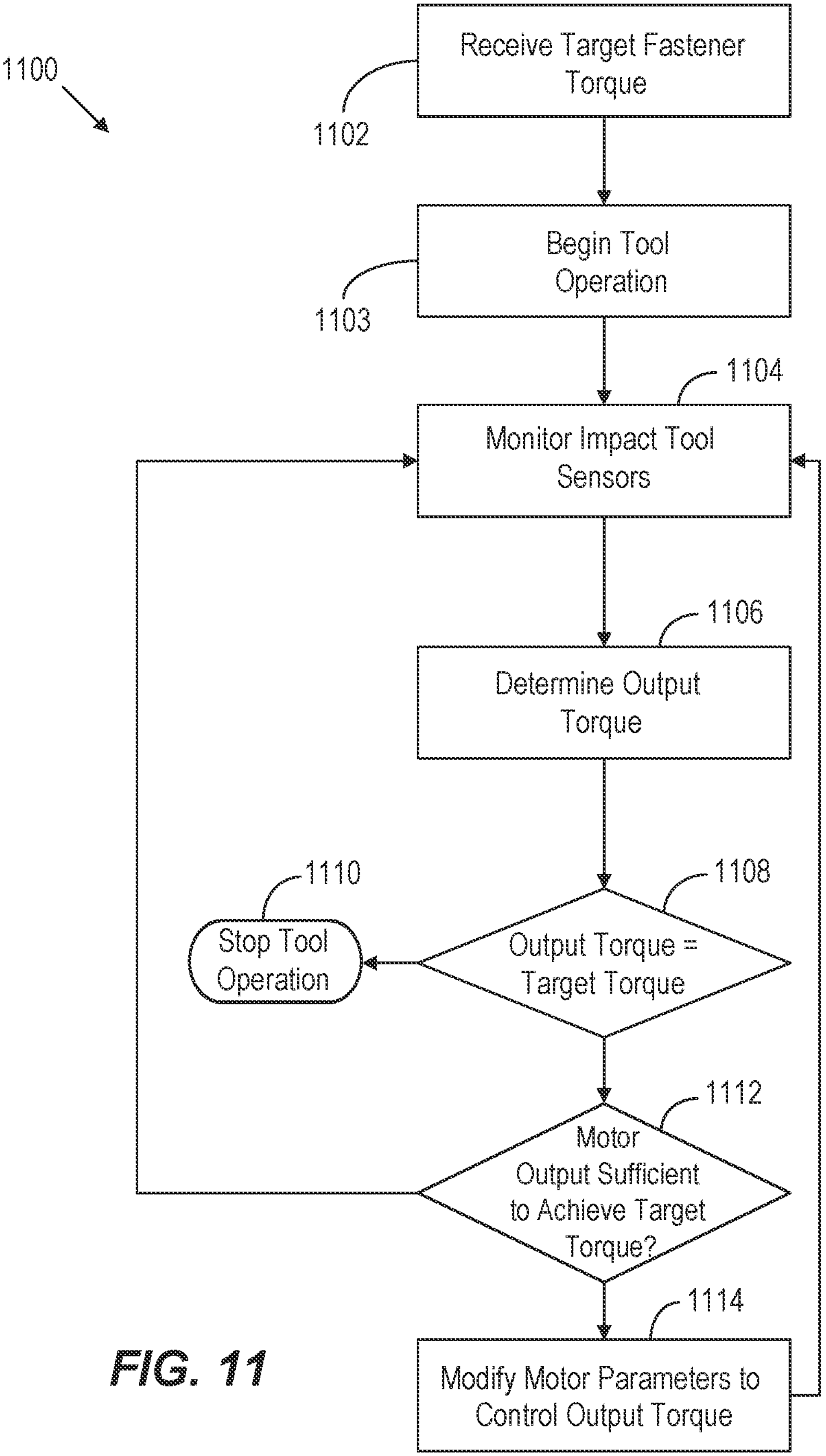
FIG. 11 is a flow chart illustrating a process for measuring the applied torque of an impulse power tool, according to some embodiments.

Turning now to FIG. 11, a process 1100 for controlling an output torque of an impulse tool is shown, according to some embodiments. In the following description of the process 1100, the process is described as operating via the impulse tool 800 and the various components thereof, as described above. However, it is contemplated that other tools, such as those described herein, and configurations may be used to perform the process 1100.

At process block 1102, the impulse tool 800 receives a target fastener torque value. In one embodiment, the target fastener torque value is received via the user interface 1000. For example, a user may input the target fastener torque value via the user interface 1000. In other embodiments, the target fastener torque value may be received via the communication interface 1002, such as via a user device 1020. In other embodiments, the target fastener torque value may be retrieved from a memory of the controller 812. For example, a user may provide an indication of the type of fastener being used (e.g. woods screw, self-tapping screw, lag bolt, etc.) via an input such as the user interface 1000 and/or the communication interface 1002. The controller 812 may then access a target fastener torque value associated with the fastener type that is stored in the memory of the controller. In some embodiments, the target fastener torque is a torque value equal to a torque value associated with the fastener being fully tightened.

Upon receiving the target fastener torque, the operation of the impulse tool 800 begins at process block 1003. The tool operation may begin when a user actuates an input device, such as a trigger, of the tool. The controller 812 then monitors one or more sensors associated with the impulse tool 800 at process block 1104. For example, the controller 812 may monitor sensors such as the torque transducer 900, the temperature sensor 1006, the speed sensor 806, and/or the gyroscopic sensor 1004. These sensors provide data that the controller 812 can use to determine the output torque, motor speed, etc.

At process block 1106, the controller 812 determines an output torque of the impulse tool 800. Various methods may be used to determine the output torque of the impulse tool 800. For example, the controller 812 may use the torque data from the torque transducer 900 to determine the output torque of the impulse tool 800. As described above, the torque transducer 900 and/or the controller 812 can convert the output of the torque transducer 900 to an output torque of the impulse tool 800 at the output spindle 814. In other embodiments, the controller 812 may use other data, either alone or in combination with the output of the torque transducer 900, to determine the output torque of the impulse tool 800. For example, the controller 812 may use temperature data from the temperature sensor 1006 and the speed sensor 806 to aid in determining the output torque. For example, the higher the heat within the impulse assembly 802, as determined by the controller 812 based on output from the temperature sensor 1006, the more speed that is required to maintain an output torque. Thus, for a constant speed, the output torque may be determined to be decreasing based on the temperature of the impulse assembly 802. The gyroscopic sensor 1004 may further provide data to the controller 812 for determining the output torque. For example, if a user is not sufficiently gripping and stabilizing the impulse tool 800 during operation, some of the output torque may be transmitted to the user via the impulse tool 800, and not to the fastener as intended. The gyroscopic sensor 1004 may provide data to the controller 812 which represents the torque transmitted to the user and not to the output spindle 814 and thereby to the fastener. In some embodiments, the controller 812 may provide an indication to the user if the losses detected by the gyroscopic sensor become too great. For example, the controller 812 may provide an indication to the user via the interface, or via the user device 1020. The indication may provide instructions to the user to grip the tool more firmly to reduce losses. In other examples, the gyroscopic sensor 1004 may be used to estimate the energy and/or torque applied to a fastener as opposed to what is applied to components of the impulse tool 800 and/or the user. In further embodiments, the determined energy and torque may be used instead of raw torque readings to determine when a fastener has been satisfactorily seated.

Figure 13A:
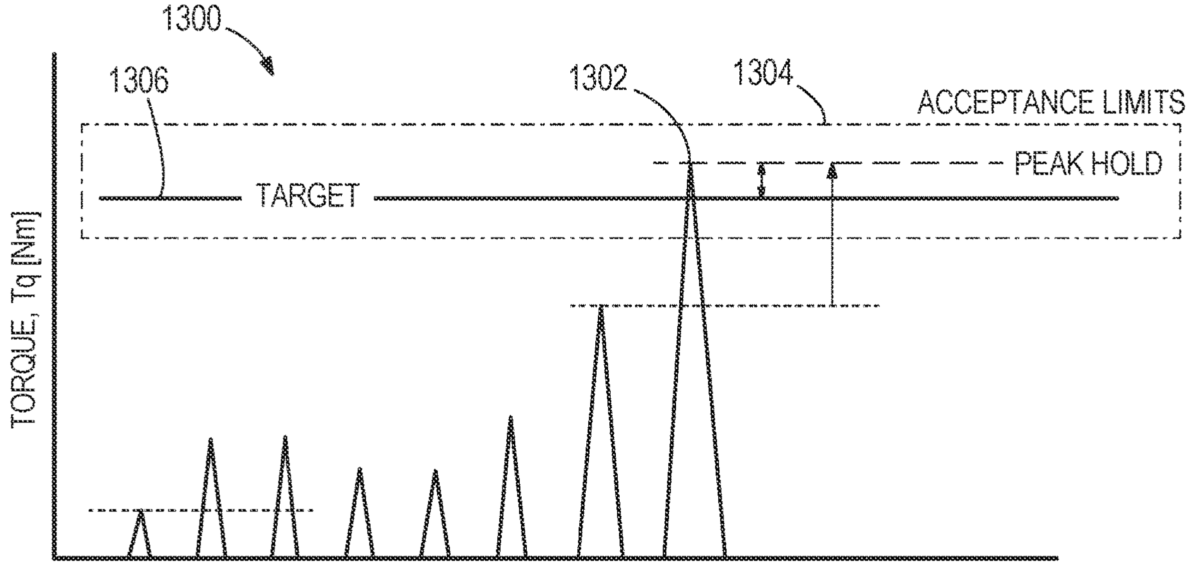
FIGS. 13A-13B are graphical representations of measured output torque of an impulse power tool over time, according to some embodiments.
Figure 13B:
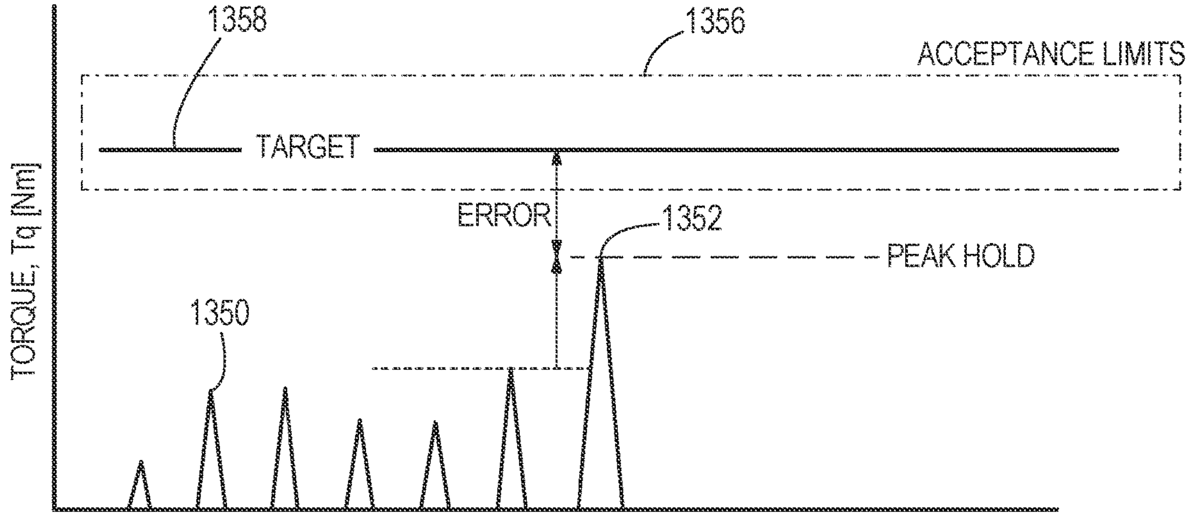

At process block 1108, the controller 812 determines if the output torque is equal to the target fastener torque. In some embodiments, the controller 812 determines that the output torque is equal to the target fastener torque if the output torque is within a predefined range of the target fastener torque. For example, the controller 812 may determine that the output torque is equal to the target fastener torque if the output torque is within +/−5% of the target fastener torque. However, in other examples, the controller 812 has a predefined range of greater than 5% or less than 5% of the difference between the output torque and the desired fastener torque. Turning now to FIG. 13A, an output torque graph 1300 is shown. Torque peak 1302 is shown to be within the acceptable range 1304 of the target torque 1306. In contrast, FIG. 13B illustrates torque values 1350, 1352 that are not within an acceptable range 1356 of the torque target 1358. When the controller 812 determines that the output torque is equal to the target torque at process block 1108, the controller 812 stops operation of the tool at process block 1110. For example, the controller 812 may stop the motor, such as by stopping power from being provided to the motor by motor driver circuit 810.

When the controller 812 determines that the output torque is not equal to the target torque at process block 1108, the controller 812 then determines whether the motor output is sufficient to achieve the target fastener torque at process block 1112. For example, as output torque increases, the output speed of the motor may also need to be increased to provide the required torque value to the fastener. The controller 812 may evaluate multiple parameters to determine whether the motor output is sufficient to achieve the target fastener torque. For example, torque data from the torque transducer 900 and speed data from the speed sensor 806 may be used to determine if the motor output is sufficient. Additionally, temperature data from the temperature sensor 1006 may be used to determine if the motor output is sufficient. For example, as the temperature of the impulse assembly increases, the motor 808 will need to rotate faster to maintain the desired torque. Additionally, the gyroscopic sensor 1004 may provide data to the controller 812. The losses detected by the gyroscopic sensor 1004 may provide an indication that the motor output is not sufficient.

When the controller 812 determines that the motor output is sufficient to achieve the target torque, the controller 812 continues to monitor the impulse tool sensors at process block 1104. When the controller 812 determines that the motor output is not sufficient to achieve the target torque, the controller 812 modifies motor parameters at process block 1114 to control the output torque of the impulse tool 800. In some embodiments, the controller 812 may use closed loop feedback control schemes, such as proportional-derivative-integral (PID) type controls to modify the motor parameters. A PID type control scheme is described in more detail below. In other embodiments, the controller 812 may utilize one or more machine learning algorithms to modify the motor parameters and/or determine whether the output torque of the impulse tool 800 is within the acceptable range. For example, the controller 812 may use supervised learning, semi-supervised learning, unsupervised learning, active learning, and/or reinforcement learning algorithms to modify the motor parameters. The controller 812 may use data from the various sensors described above as inputs to the machine learning algorithms. The machine learning algorithms (e.g., trained with sensor data, motor parameters, and known output torque values) may then generate outputs for driving the motor 808 to obtain the desired fastener torque and/or for stopping the motor 808 upon determining that the output torque is within the acceptable range.

Upon modifying one or more motor parameters at process block 1114, the controller 812 continues to monitor the impulse tool 800 sensors at process block 1104.

Figure 12:
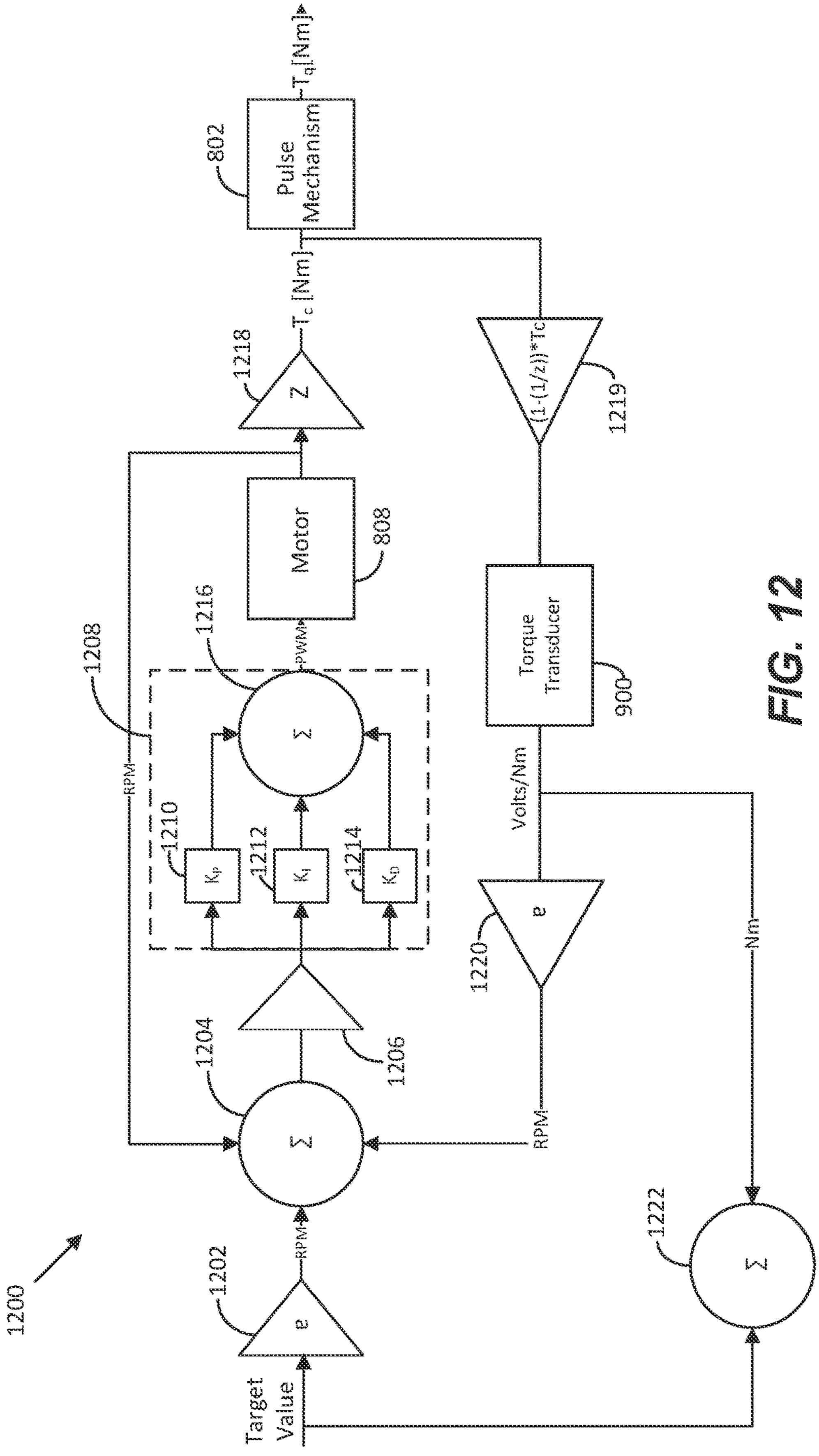
FIG. 12 is a schematic diagram of a feedback control circuit of the impulse power tool of FIG. 1B, according to some embodiments.

Turning now to FIG. 12, a control schematic for a closed loop control system 1200 for controlling the output torque of an impulse tool is shown, according to some embodiments. It is understood that the closed loop control system 1200 is but one way to execute the above processes and actions. As described above, other control schemes, including machine learning algorithms, may also be used.

A target fastener torque value is input into a conversion block 1202. As described above, the target fastener value may be input via the user interface 1000 and/or communication interface 1002. The conversion block 1202 converts the target fastener torque value into a motor speed (RPM). In one embodiment, the conversion block 1202 converts the target fastener torque value into desired motor speed via a lookup table (e.g., stored within the controller 812). The lookup table may include motor speeds for different target fastener torque values. The conversion block 1202 outputs a motor speed value associated with the target fastener torque value to the summing block 1204. The summing block 1204 outputs an error value representative of a difference between the inputs to the summing block 1204 as an input to gain amplifier 1206. The gain amplifier 1206 amplifies the error signal from the summing block 1204, and outputs an amplified signal to the PID block 1208. The PID block 1208 includes a proportional control term 1210, an integral control term 1212, and a derivative control term 1214. The amplified signal from the gain amplifier 1206 is provided to each of the control terms 1210, 1212, 1214. The outputs from the control terms 1210, 1212, 1214 are summed at summing block 1216 and output as a control variable. The control variable may be converted to a control signal to be output to the motor driver circuit 810, which may output a PWM signal associated with the control signal to the motor 808.

An output speed of the motor 808 may be provided to the summing block 1204. For example, the speed sensor 806 may provide the output speed of the motor to the summing block 1204. The output speed is used as another input to the summing block 1204 to generate the error signal provided to the PID block 1208. The output speed of the motor 808 may then be provided to a gain amplifier 1218. The output of the gain amplifier 1218 is representative of the output torque of the motor 808, and is represented at Tc. The motor output is provided to the impulse assembly 802, wherein it is output as an output torque $T_q$.

The output of the motor 808 is further transmitted to the torque transducer 900, via converter module 1219. Converter module is represents the difference in the torque that is provided to the torque transducer 900 versus the torque that is provided to the motor 808. The torque provided to the torque transducer 900 differs from the torque provided to the motor 808 by a set ratio defined by the gear ration of the impulse tool. In one embodiment, the difference may be expressed as an equation, such as (1−(1/z))*Tc, wherein Tc is the torque applied to the pulse mechanism 802, and z represents the gear ration (e.g., the gain in torque from the motor). The torque transducer generates an output signal representative of the sensed torque applied by the motor 808 (see above). In one embodiment, the torque transducer 900 may output a volts/Nm output signal. However, other outputs are also contemplated. The output of the torque transducer 900 is provided as an input to converter block 1220. The converter block 1220 is configured to convert the torque signal from the torque transducer 900 into a speed based signal, such as RPMs. In one embodiment, the converter block 1220 converts the torque signal into a speed signal using a lookup table. The lookup table may be configured to provide speed values for a given torque input. In one embodiment, the lookup table is stored in a memory of the controller. In other embodiments, the lookup table may be modified over time. The output of the converter block 1220 is then output to the summing block 1204. The summing block may generate the error value described above based on the target speed value, the actual motor speed value, and the speed value representative of the measured output torque.

The output of the torque transducer 900 may further be output to the summing block 1222, along with the target value. The summing block 1222 can compare the measured torque to the target torque. When the summing block 1222 determines that the actual torque is equal to the target torque (e.g., the error value is zero or within an acceptable range (e.g., ±5%)), the operation of the tool is ended.

Figure 14:
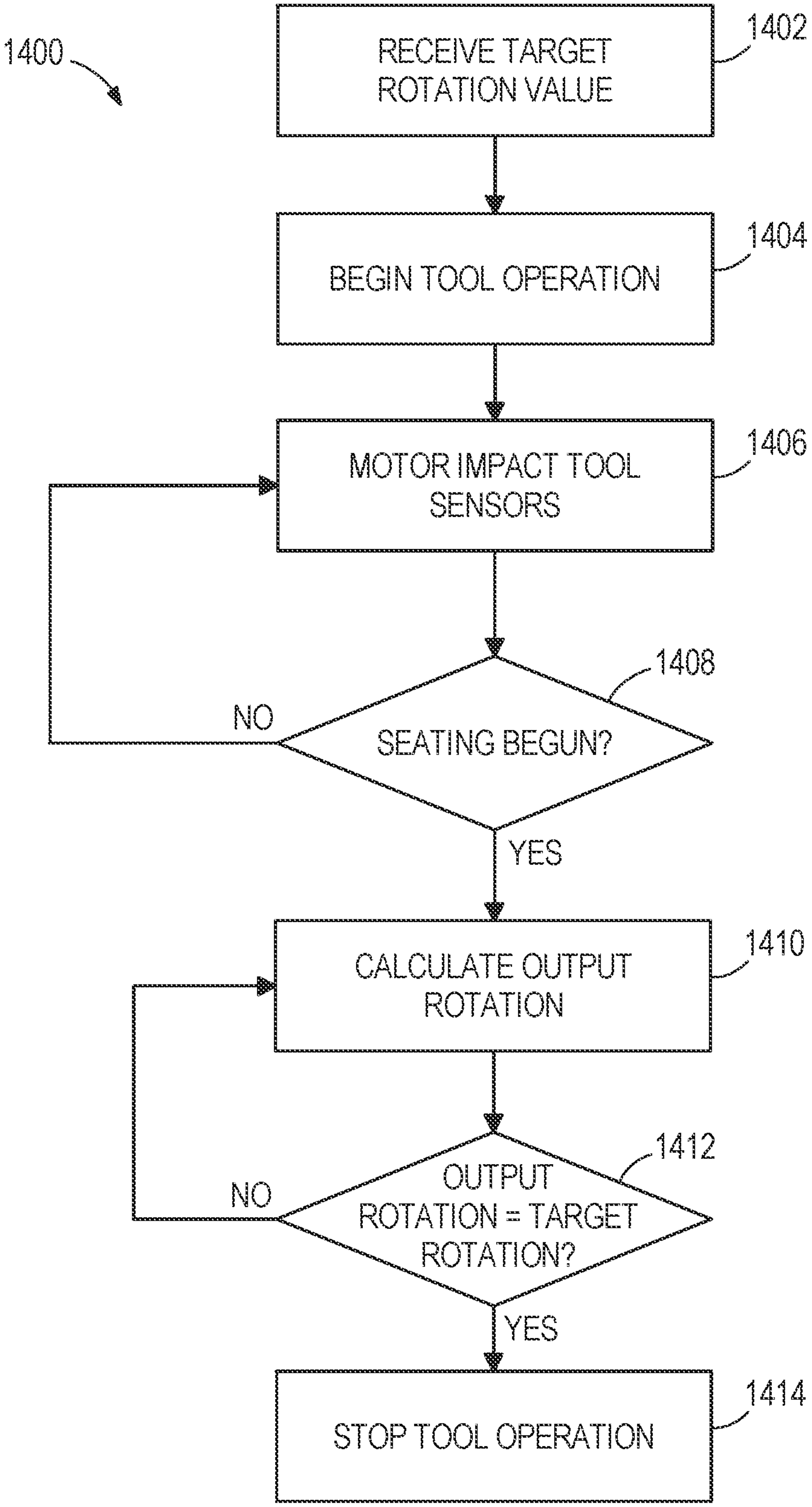
FIG. 14 is a flowchart illustrating a process for a turn-of-nut application for an impulse power tool, according to some embodiments.

Turning now to FIG. 14, a flowchart illustrating a process 1400 for a turn-of-nut application of the impulse tool described above is provided, according to some embodiments. The turn-of-nut fastening verification application is one in which a tool uses a torque estimate to detect the act of seating or engaging a fastener, and then a second criteria is set forth to verify the torque, such as a target output rotation of an anvil or other output rotation. Specifically, this application is used when driving a nut that is threaded onto a threaded fastener, such as a bolt. In the following description of the process 1400, the process is described as operating via the impulse tool 800 and the various components thereof, as described above. However, it is contemplated that other tools, such as those described herein, and configurations may be used to perform the process 1400.

At process block 1402, the impulse tool 800 receives a target rotation value. The target rotational value may be a target amount of angular rotation (e.g. 90 degrees, 120 degrees, 360 degrees, etc.) In one embodiment, the target fastener rotation value is received via the user interface 1000. For example, a user may input the target fastener rotation value via the user interface 1000. In other embodiments, the target fastener rotation value may be received via the communication interface 1002, such as via a user device 1020. In other embodiments, the target fastener rotation value may be retrieved from a memory of the controller 812. For example, a user may provide an indication of the type of fastener being used (e.g., nuts, lock nuts, etc.) via an input such as the user interface 1000 and/or the communication interface 1002. The controller 812 may then access a target fastener rotation value associated with the fastener type that is stored in the memory of the controller 812. In some embodiments, the target fastener rotation value is a rotation value equal to a torque value associated with the fastener being fully tightened. In one embodiment, a user provides the type of fastener being used along with the material of the workpiece (e.g., wood, concrete, steel, etc.) which is then used by the controller 812 to determine the target rotational value. For example, the controller 812 may access a look-up table to determine a target rotational value associated with the selected material of the workpiece and the type of fastener being used.

Upon receiving the target rotational value, the operation of the impulse tool 800 begins at process block 1404. The tool operation may begin when a user actuates an input device, such as a trigger, of the tool. The controller 812 then monitors one or more sensors associated with the impulse tool 800 at process block 1406. For example, the controller 812 may monitor sensors such as the torque transducer 900, the temperature sensor 1006, the speed sensor 806, and/or the gyroscopic sensor 1004. These sensors provide data that the controller 812 can use to determine the output torque, motor speed, etc.

At process block 1408, the controller 812 determines that the seating of the fastener has begun. For example, the controller 812 may determine that seating has begun based on one or more sensed parameters (e.g., exceeding a threshold), such as an increase in current, decrease in speed, increase in torque, increase in reactionary torque sensed by the motion sensor, etc. In one embodiment, the controller 812 determines that the seating of the fastener has begun by monitoring the torque output of the torque transducer 900. Seating begins when the head of a fastener reaches the surface of a workpiece. In response to the controller determining that the fastener begun to be seated, the controller 812 continues to monitor the sensors. Based on the controller 812 determining that the seating of the fastener has begun, the controller 812 calculates the output rotation at process block 1410. The output rotation may be calculated based on the timing of the impulses in combination with the sensed motor speed. Additionally, in some embodiments, rotation detected by the motion sensor may also be used to determine the output rotation. At process block 1412, the controller 812 determines whether the output rotation is equal to the target rotation value (e.g. whether the rotational angle determined after seating has occurred is equal to the target rotational angle). In response to the output rotation being determined to not be equal to the target rotation value, the controller 812 continues to calculate the output rotation at process block 1410. In response to the output rotation being determined to be equal to the target rotation value, the controller 812 determines that the output rotation is equal to the target rotation, the controller 812 stops the operation of the tool at process block 1414.

Figure 17:
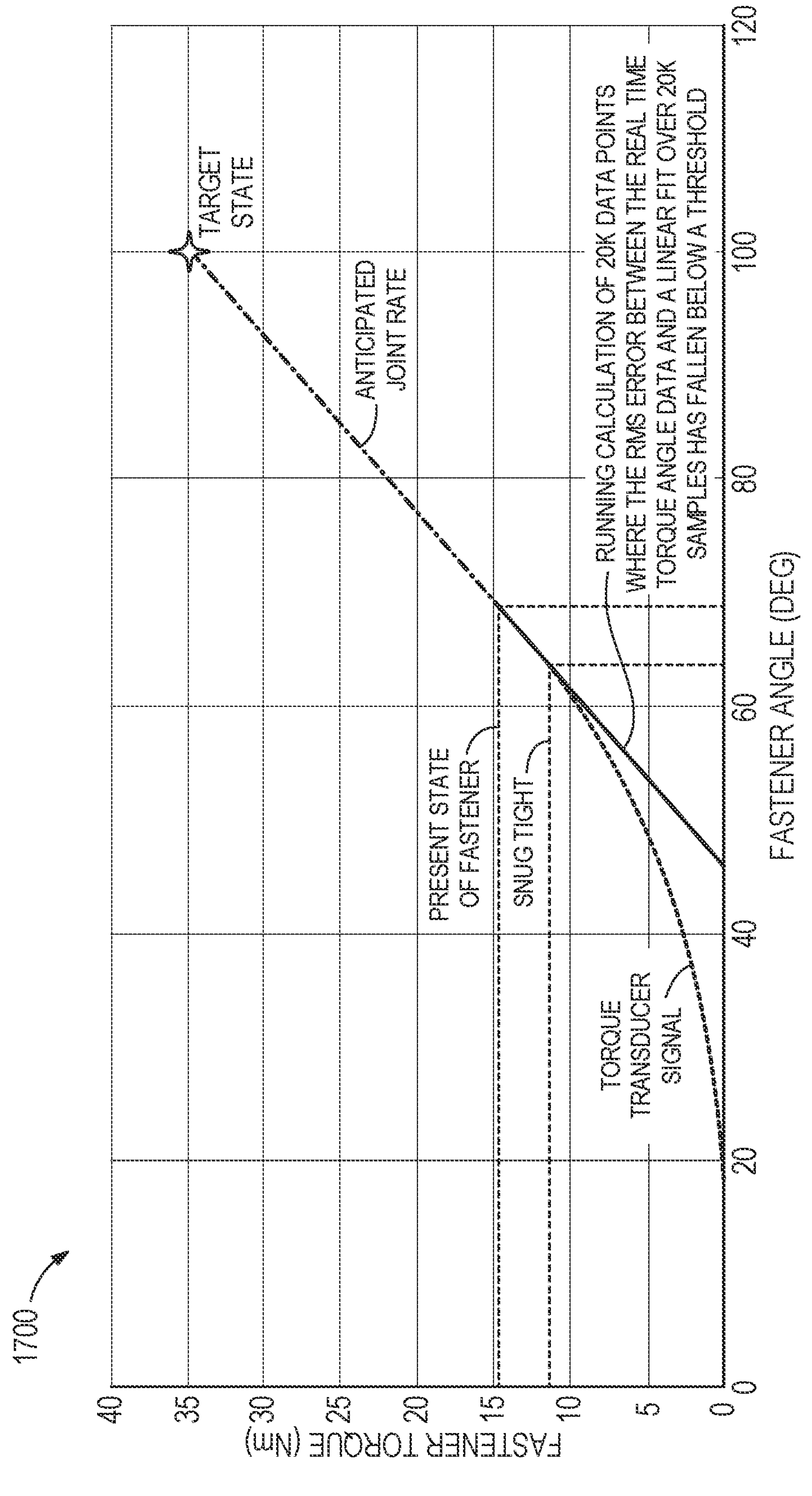
FIG. 17 is a plot illustrating a torque vs. angle of rotation plot for determining the level of seating of a fastener.

In some embodiments, the turn of nut process 1400 may be configured to determine a "snug-tight" condition. As shown in FIG. 17, a snug tight condition is observed in the data plot 1700 when the torque vs. angle of rotation becomes linear to a certain degree.

Figure 15:
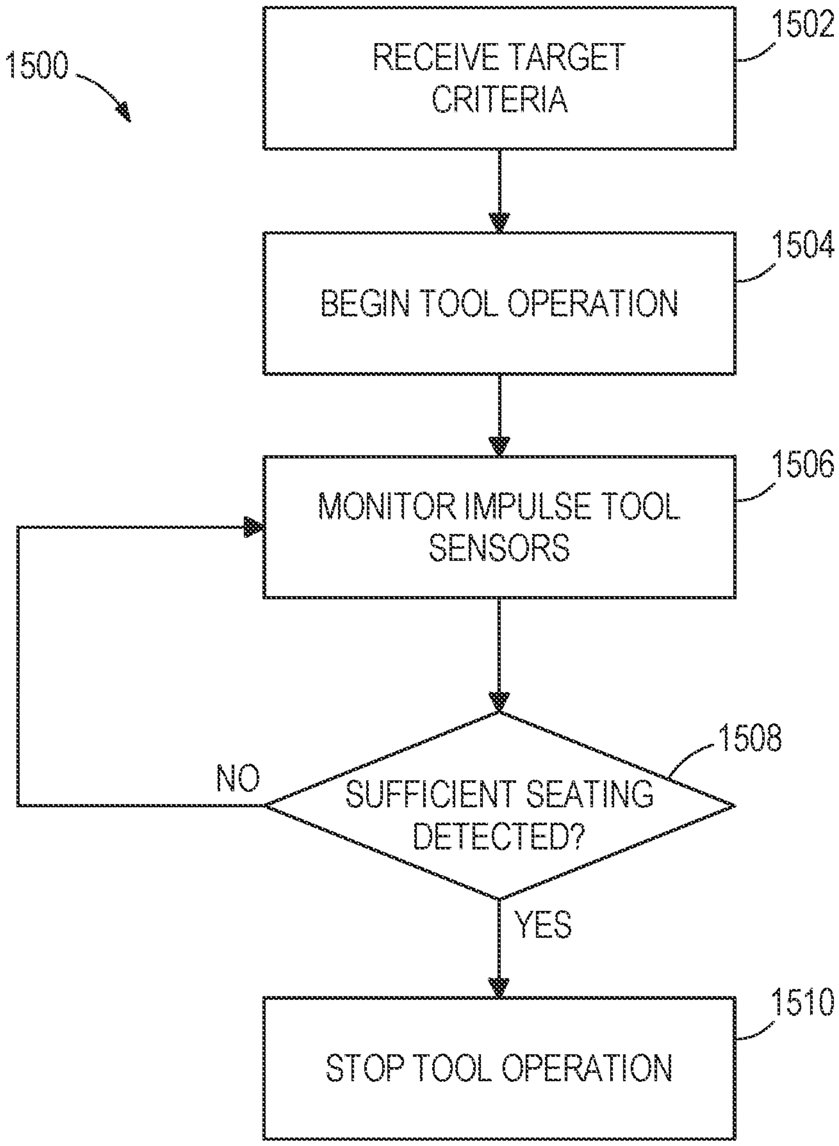
FIG. 15 is a flowchart illustrating a process for a screw seating application for an impulse power tool, according to some embodiments.

Turning now to FIG. 15, a flowchart illustrating a process 1500 for a screw seating application of the impulse tool described above is provided, according to some embodiments. The screw seating application is one in which a tool uses a torque estimate to detect the act of seating or engaging a fastener such as a screw, into a workpiece. In the following description of the process 1500, the process is described as operating via the impulse tool 800 and the various components thereof, as described above. However, it is contemplated that other tools, such as those described herein, and configurations may be used to perform the process 1500.

At process block 1502, the impulse tool 800 receives a target criteria associated with seating the fastener. In one embodiment, the target criteria is received via the user interface 1000. For example, a user may input the target criteria directly via the user interface 1000. In other embodiments, the target criteria may be received via the communication interface 1002, such as via a user device 1020. In other embodiments, the target criteria may be retrieved from a memory of the controller 812. For example, a user may provide an indication of the type of fastener being used (e.g., wood screws, self-tapping screw, lag bolt, etc.) via an input such as the user interface 1000 and/or the communication interface 1002. The user may also provide the type of fastener being used along with the material of the workpiece (e.g., wood, concrete, etc.), which is then used by the controller 812 to determine a target rotation speed. The controller 812 may then access one or more target criteria associated with the fastener type and the workpiece type. The target criteria may be stored in the memory of the controller 812. In some embodiments, the target criteria includes an estimated torque value, a torque profile over time, an angular displacement, torque over each impulse, energy into the system, or other variations and combinations thereof. The target criteria may be associated with the selected fastener being sufficiently seated into the workpiece. For example, the controller 812 may access a look-up table to determine a target criteria associated with the selected material of the workpiece and the type of fastener being used.

Upon receiving the target criteria, the operation of the impulse tool 800 begins at process block 1504. The tool operation may begin when a user actuates an input device, such as a trigger, of the tool. The controller 812 then monitors one or more sensors associated with the impulse tool 800 at process block 1506. For example, the controller 812 may monitor sensors such as the torque transducer 900, the temperature sensor 1006, the speed sensor 806, and/or the gyroscopic sensor 1004. These sensors provide data that the controller 812 can use to determine the output torque, motor speed, etc.

At process block 1508, the controller 812 determines whether sufficient seating has occurred. For example, the controller 812 may compare the data received from the sensors against the received target criteria. In some embodiments, the controller 812 may evaluate torque data across multiple impulses along with other sensed data (for example, speed, time, reaction forces, etc.). In some embodiments, the controller 812 develops a torque profile based on the evaluated torque data measured across multiple impulses, and compares the torque profile against the target criteria. In response to the controller 812 determining that the torque profile, and/or other monitored data, is equal to the target criteria indicating there is sufficient seating of the fastener, the controller 812 stops the tool operation at process block 1510. For example, the controller 812 may evaluate both the torque profile and one or more angular displacements against target torque profiles and target angles in the target criteria to determine whether the fastener is sufficiently seated. In response to the controller 812 determining that the torque profile, and/or other monitored data is not equal to the target criteria, the controller continues to monitor the impulse tool sensors at process block 1506.

Various features and advantages of the invention are set forth in the following claims.

What is claimed is:

1. A power tool comprising:
a housing;
a motor positioned within the housing; and
an impulse assembly coupled to the motor to receive torque therefrom, the impulse assembly including
a cylinder at least partially forming a chamber containing a hydraulic fluid,
an anvil positioned at least partially within the chamber,
a hammer positioned at least partially within the chamber, the hammer including a first side facing the anvil and a second side opposite the first side;
a biasing member biasing the hammer towards the anvil, and
a valve movable between a first position that permits a first fluid flow rate of the hydraulic fluid in the chamber from the second side to the first side, and a second position that permits a second fluid flow rate of the hydraulic fluid in the chamber from the first side to the second side,
wherein the chamber is a first chamber, and wherein the cylinder defines a second, expansion chamber in fluid communication with the first chamber.

2. The power tool of claim 1, wherein the second fluid flow rate is greater than the first fluid flow rate.

3. The power tool of claim 2, wherein the valve is in the second position when the hammer moves toward the anvil.

4. The power tool of claim 1, wherein the biasing member is a first biasing member, wherein the valve is configured as an annular disc and is one component of a valve assembly disposed in the chamber, and wherein the valve assembly further includes a valve housing, and a second biasing member positioned between the valve housing and the valve.

5. The power tool of claim 4, wherein the second biasing member biases the disc toward the hammer.

6. The power tool of claim 4, wherein the hammer defines a rear surface on the second side and the disc engages the rear surface when the disc is in the first position.

7. The power tool of claim 6, wherein the disc is spaced from the rear surface when the disc is in the second position.

8. The power tool of claim 4, wherein the disc includes an aperture in fluid communication with an opening formed in the hammer extending between the first side and the second side.

9. The power tool of claim 8, wherein the disc further includes an auxiliary opening offset from the aperture, wherein the hydraulic fluid does not flow through the auxiliary opening when the disc is in the first position, and the hydraulic fluid flows through the auxiliary opening when the disc is in the second position.

10. The power tool of claim 4, wherein the valve housing defines a cavity, and wherein the disc and the second biasing member are positioned within the cavity.

11. The power tool of claim 4, wherein the first biasing member biases the valve housing toward the hammer.

12. The power tool of claim 11, wherein the valve housing further includes a flange engaged by the first biasing member.

13. The power tool of claim 1, wherein the hammer defines a recess, and wherein the valve is at least partially received within the recess.

14. The power tool of claim 1, further comprising a plug positioned within the expansion chamber.

15. The power tool of claim 14, wherein the plug is configured translate within the expansion chamber to vary a volume of the expansion chamber.

16. A power tool comprising:
a housing;
a motor positioned within the housing; and
an impulse assembly coupled to the motor to receive torque therefrom, the impulse assembly including
a cylinder at least partially forming a first chamber containing a hydraulic fluid and a second, expansion chamber in fluid communication with the first chamber to receive hydraulic fluid therefrom,
an anvil positioned at least partially within the first chamber,
a hammer positioned at least partially within the first chamber and engageable with the anvil for transferring rotational impacts to the anvil,
a biasing member biasing the hammer towards the anvil, and
a plug positioned within the expansion chamber;
wherein the plug is movable relative to the cylinder to vary a volume of the expansion chamber.

17. The power tool of claim 16, wherein the expansion chamber is in fluid communication with the first chamber by a passageway formed within the cylinder.

18. The power tool of claim 16, wherein the plug includes an annular groove and an O-ring positioned within the annual groove.

19. The power tool of claim 16, further comprising a valve assembly positioned within the chamber for damping the flow of hydraulic fluid through the first chamber.

* * * * *